(12) United States Patent
Kobayashi

(10) Patent No.: US 8,694,006 B2
(45) Date of Patent: Apr. 8, 2014

(54) BASE STATION, MOBILE STATION, HANDOVER METHOD, AND DOWNLOAD METHOD

(75) Inventor: Noboru Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 121 days.

(21) Appl. No.: 13/094,982

(22) Filed: Apr. 27, 2011

(65) Prior Publication Data

US 2011/0269494 A1 Nov. 3, 2011

(30) Foreign Application Priority Data

Apr. 30, 2010 (JP) ................................ 2010-105236

(51) Int. Cl.
*H04W 36/20* (2009.01)

(52) U.S. Cl.
USPC ........ 455/444; 455/436; 455/115.4; 370/331; 370/332

(58) Field of Classification Search
USPC ......... 370/331–333; 455/161.1, 161.3, 226.1, 455/226.2, 436–440, 444, 500, 513, 115.1, 455/115.3, 132–135
See application file for complete search history.

(56) References Cited

U.S. PATENT DOCUMENTS

| | | | | |
|---|---|---|---|---|
| 8,254,986 | B2 * | 8/2012 | Russell | 455/552.1 |
| 2002/0137514 | A1 * | 9/2002 | Mitsugi et al. | 455/436 |
| 2006/0046644 | A1 * | 3/2006 | Chung et al. | 455/11.1 |
| 2006/0052124 | A1 * | 3/2006 | Pottenger et al. | 455/515 |
| 2009/0298544 | A1 * | 12/2009 | Karampuri | 455/561 |
| 2010/0136978 | A1 * | 6/2010 | Cho et al. | 455/441 |
| 2012/0020240 | A1 * | 1/2012 | Miura | 370/252 |

FOREIGN PATENT DOCUMENTS

| | | |
|---|---|---|
| JP | 2002-291011 A | 10/2002 |
| JP | 2005-12300 A | 1/2005 |
| JP | 2007-208312 A | 8/2007 |
| JP | 2007-281896 A | 10/2007 |
| JP | 2008-103985 A | 5/2008 |
| WO | WO-2008/157576 A1 | 12/2008 |

OTHER PUBLICATIONS

Japanese Office Action mailed Jun. 11, 2013 for corresponding Japanese Application No. 2010-105236, with Partial English-language Translation.

* cited by examiner

*Primary Examiner* — Cong Tran
(74) *Attorney, Agent, or Firm* — Fujitsu Patent Center

(57) ABSTRACT

A base station includes a first receiver that receives a signal from the base station, the signal indicating a first wireless quality that is a wireless quality of signals received by a mobile station which uses software-defined radio and communicates with the base station using a first communication protocol, and a processor that executes processing to download communication software that causes the mobile station to execute communication processing according to a second communication protocol based on a first condition of the first wireless quality, and executes processing to transmit a handover instruction signal to cause a handover of the mobile station to a second base station that communicates with the mobile station using the second communication protocol based on a second condition of the first wireless quality, wherein the first condition is a condition set to be satisfied before the second condition when the first wireless quality decreases.

9 Claims, 22 Drawing Sheets

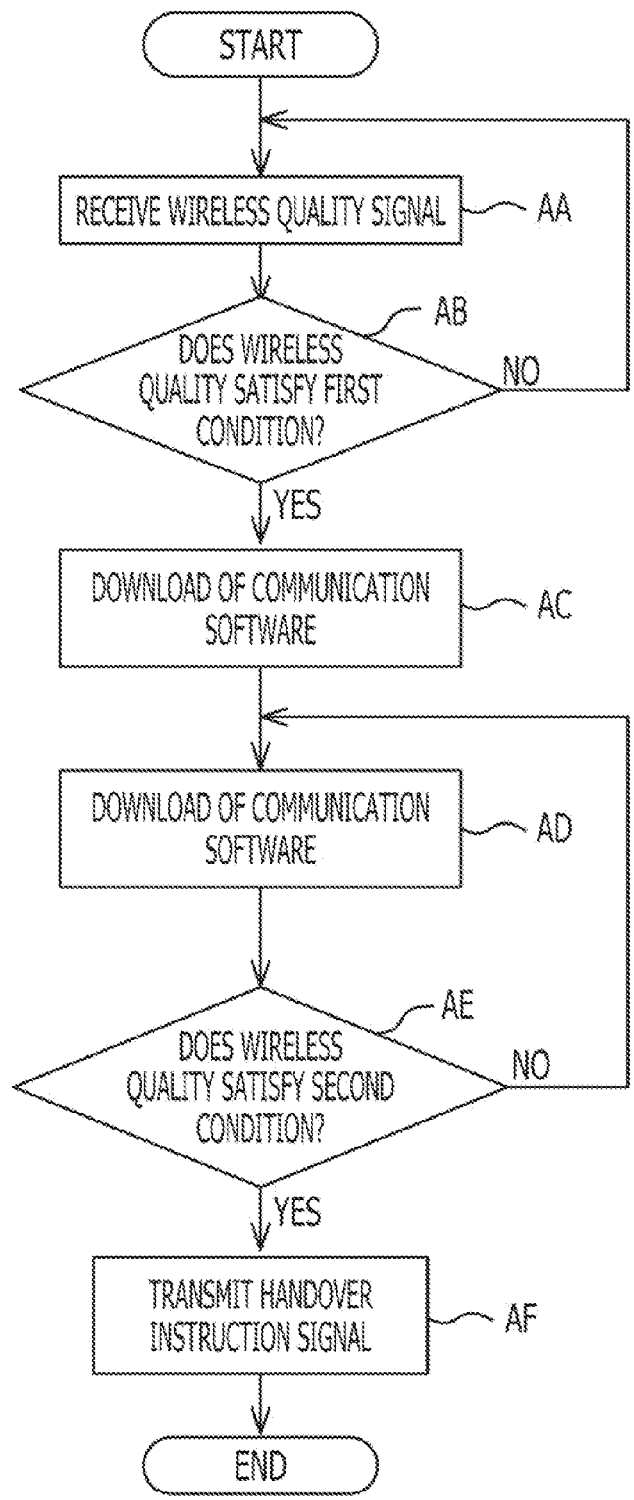

BASE STATION, MOBILE STATION, HANDOVER METHOD, AND DOWNLOAD METHOD

CROSS-REFERENCE TO RELATED APPLICATION

This application is based upon and claims the benefit of priority of the prior Japanese Patent Application No. 2010-105236, filed on Apr. 30, 2010, the entire contents of which are incorporated herein by reference.

FIELD

Embodiments described herein relate to a handover of a software-defined radio device.

BACKGROUND

A software-defined radio device is a device using software-defined radio, which is a technique for executing processing that uses the same hardware for communicating with devices having different communication protocols by rewriting processing software in the device. When executing a handover between communication areas with different communication protocols, communication software that enables the communication protocol after the handover, may be downloaded to a mobile station as a communication service using the software-defined radio device.

SUMMARY

According to an aspect of the embodiments discussed herein, a base station includes a first receiver that receives a signal from the base station, the signal indicating a first wireless quality that is a wireless quality of signals received by a mobile station which uses software-defined radio and communicates with the base station using a first communication protocol, and a processor that executes processing to download, to the mobile station, communication software that causes the mobile station to execute communication processing according to a second communication protocol based on a first condition of the first wireless quality, and executes processing to transmit, to the mobile station, a handover instruction signal to cause a handover of the mobile station to a second base station that communicates with the mobile station using the second communication protocol based on a second condition of the first wireless quality, wherein the first condition is a condition set to be satisfied before the second condition when the first wireless quality decreases.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing summary description and the following detailed description are exemplary and explanatory and are not restrictive of the embodiments, as claimed.

BRIEF DESCRIPTION OF DRAWINGS

FIG. 7 illustrates a first example of processing by the base station.

DESCRIPTION OF EMBODIMENTS

Figure 1:
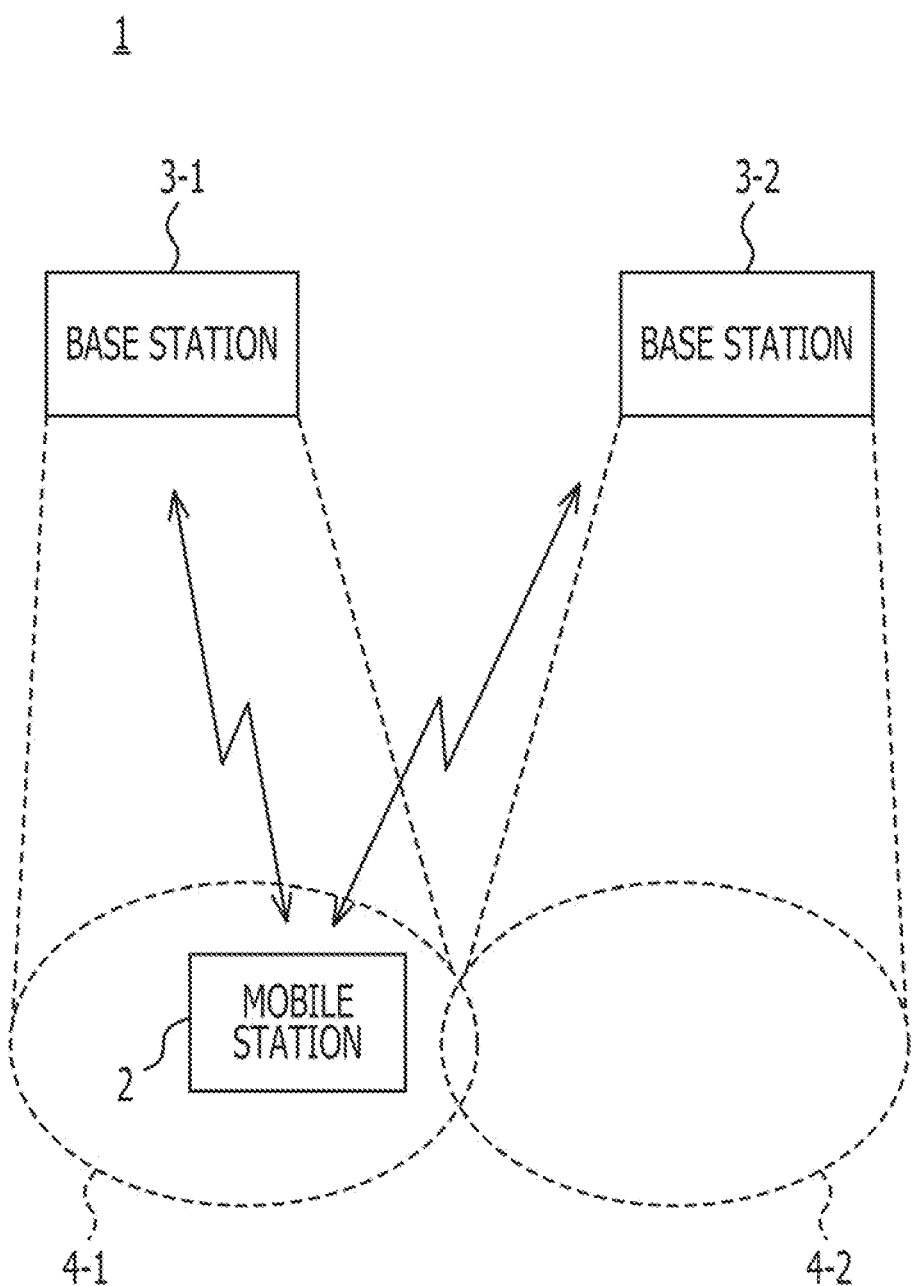
FIG. 1 illustrates an example configuration of a communication system.

The embodiments will be explained hereinbelow with reference to the attached drawings.

Regarding the embodiments discussed herein, the following observations are made.

The following explains operations of a multimode wireless communication terminal that implements a wireless communication function through software-defined radio. In the following explanation, the multimode wireless terminal will be referred to simply as a "terminal". First, it is assumed that a terminal is executing communication using radio access technology (RAT). Here, a radio access system (RAT) shall be referred to as "old RAT". The terminal using the old RAT for communication is instructed to execute a handover from a network side.

Here, the terminal or a network side server decides a switchover target RAT candidate. When the network side server decides the switchover target RAT candidate, the network server sends the candidate to the terminal using Basic Access Signaling (BAS) and a control channel of the old RAT used for communication. The switchover target RAT candidate is referred to as a new RAT.

The terminal determines whether or not the new RAT software is stored in the terminal. If the software for implementing the new RAT wireless communication function is not stored in the terminal, the software for implementing the new RAT wireless software function is multiplexed onto the old RAT communication data and downloaded from the network side.

Furthermore, the following explains a method for causing a wireless terminal device with a non-volatile memory to download communication software from a program server. In this method, the wireless terminal device requests second communication protocol communication software for switching communication protocol from a first communication protocol to the second communication protocol that has not been stored in a non-volatile memory by a basic module. Then, the wireless terminal device receives the basic module in the second communication protocol communication software using the first communication protocol. If the transmission rate of the second communication protocol is lower than the transmission rate of the first communication protocol, an extension module in the second communication protocol communication software is received using the first communication protocol. If the transmission rate of the second communication protocol is higher than the transmission rate of the first communication protocol, the extension module in the second communication protocol communication software is received using the received basic module of the second communication protocol. The received basic module and extension module of the second communication protocol are stored in the non-volatile memory.

Furthermore, the following explains a wireless device applicable to a cellular mobile communication system in which multiple communication system service areas with different communication methods are at least partially overlapping. This wireless device includes a wireless unit that receives and transmits wireless signals; a storage device that stores multiple system modules made up of software modularized signal processing functions for communicating with wireless communication systems; a signal processing resource that processes signals received and transmitted through the wireless unit, temporarily holds the system modules corresponding to a specific wireless communication system assigned by being read and provided from the storage device, and executes processing on signals corresponding to the held system module; and a controller. The controller includes a handover manager that executes management control for assigning, to the signal processing resource, system modules corresponding to the wireless communication system to be used from among the system modules stored in the storage device; and executes management control for assigning, to the signal processing resource, the system modules corresponding to the handover target wireless communication system in place of the system modules of the currently used wireless communication system, at the time when handover conditions are satisfied, within service areas that are overlapping due to multiple overlapping wireless communication systems.

Furthermore, the following explains a system that has a mobile station having reconfigurable wireless interface unit that may be reconfigured using a software activation module, a base station that communicates with the mobile station through a wireless link, and a reconfiguration server connected to the base station through an access network. In this system, the mobile station has a module holding unit that holds multiple optional modules corresponding to the wireless interface unit. The reconfiguration server has a module accumulation unit that stores and controls multiple modules, and a module control unit that controls module types held by the mobile station. The base station is operated by a method that includes a first step in which the mobile station sends information on a status of wireless communication between the base station and the mobile station, a second step in which the reconfiguration server uses the module accumulation unit and the module control unit to choose to add or delete modules corresponding to the mobile station according to the information on the status of wireless communication, a third step in which the reconfiguration server sends module addition or deletion information to the mobile station through the base station, and a fourth step in which the mobile station changes the module in the module holding unit according to the module addition or deletion information. The mobile station uses any one of the multiple modules stored in the module holding unit to reconfigure the wireless interface.

In handover processing, the mobile station receives a handover instruction from the network and then downloads the software for implementing the communication method after the handover from the network. However, the handover will be executed when the wireless communication quality between the mobile station and the currently communicating base station is reduced.

As a result, when the mobile station starts the download of the communication software for the post-handover communication method after receiving the handover instruction, the download may not be completed due to the poor wireless quality.

FIG. 1 illustrates an example configuration of a communication system. A communication system 1 includes a mobile station 2, a base station 3-1, and a base station 3-2. The mobile station 2 is a software-defined radio device and may execute communication processing according to a first communication protocol and a second communication protocol by overwriting communication software activated in the mobile station 2.

The base station 3-1 communicates with the mobile station 2 located in a coverage area 4-1 using the first communication protocol. The base station 3-2 communicates with the mobile station 2 located in a coverage area 4-2 using the second communication protocol. In the following explanation, the base stations 3-1 and 3-2 may also be referred to collectively as base stations 3.

Figure 2:
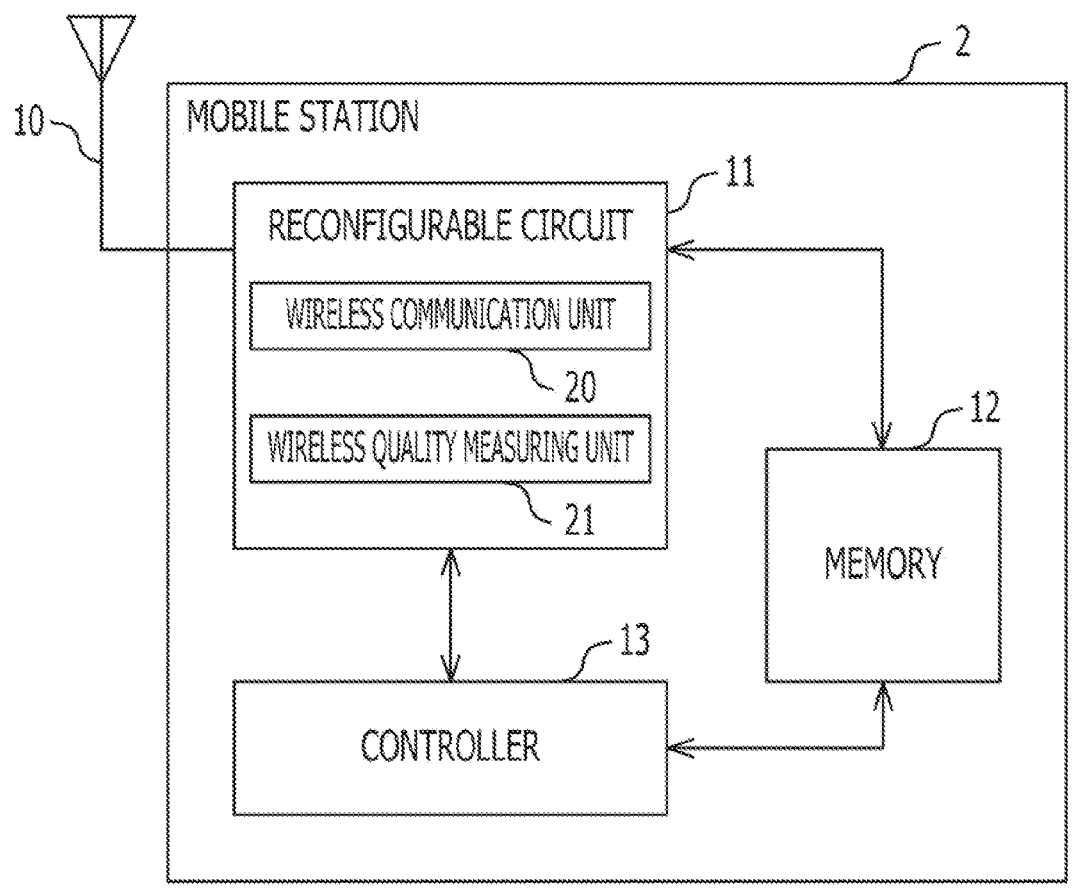
FIG. 2 illustrates an example hardware configuration of a mobile station.

FIG. 2 illustrates an example hardware configuration of the mobile station 2. The mobile station 2 includes an antenna 10, a reconfigurable circuit 11, a memory 12, and a controller 13. The reconfigurable circuit 11 is a signal processing circuit and is defined, by the software, according to the type of signal processing being executed by the reconfigurable circuit 11. The reconfigurable circuit 11 is reconfigured according to changes in the software.

For example, the reconfigurable circuit 11 includes either one of a processor for executing programs and a programmable logic circuit, or both the processor and the programmable logic circuit. The reconfigurable circuit 11 is reconfigured according to a change in the program executed by the processor, or according to a change in circuit configuration data of the programmable logic circuit.

The reconfigurable circuit 11 may include, for example, a microprocessor (CPU: central processing unit), a digital signal processor (DSP), or a field programmable gate array (FPGA). Furthermore, the reconfigurable circuit 11 may include any of a programmable logic device (PLD), a dynamic reconfigurable processor (DRP), or a reconfigurable processor (RCP).

The memory 12 stores software prescribing the signal processing executed by the reconfigurable circuit 11. Furthermore, the memory 12 may also store a program activated by the controller 13 and data used for activating the program.

The controller 13 executes processing to download software for reconfiguring the reconfigurable circuit 11, and executes reconfiguration processing to reconfigure the reconfigurable circuit 11. The controller 13 downloads a part or all of the software for reconfiguring the reconfigurable circuit 11 from the base stations 3. The controller 13 may include a processor for executing reconfiguration processing and download processing activated by a program stored in the memory 12.

The controller 13 downloads, from the base stations 3, communication software to cause the reconfigurable circuit 11 to execute communication processing according to a specific communication protocol. The reconfigurable circuit 11 executes processing as a wireless communication unit 20 described below, based on reconfiguration of the reconfigurable circuit 11 by the downloaded communication software.

In the following explanation, the communication software causing the reconfigurable circuit 11 to execute communication processing according to the first communication protocol may be referred to as the "first communication protocol communication software". In the following explanation, the communication software causing the reconfigurable circuit 11 to execute communication processing according to the second communication protocol may be referred to as the "second communication protocol communication software".

The wireless communication unit 20 transmits and receives wireless signals through the antenna 10 and executes communication processing between the mobile station 2 and the base station 3 according to the specific communication protocol. The wireless communication unit 20 receives, from the base station 3-1, a handover instruction for executing a handover of the mobile station 2 from the base station 3-1 to the base station 3-2. After receiving the handover instruction, the wireless communication unit 20 executes the handover processing to handover the mobile station 2 from the base station 3-1 to the base station 3-2.

The controller 13 downloads, from the base stations 3, wireless quality measuring software for causing the reconfigurable circuit 11 to measure the wireless quality of the signals received using the specific communication protocol. The reconfigurable circuit 11 executes processing as a wireless quality measuring unit 21 described below, based on reconfiguration of the reconfigurable circuit 11 by the downloaded wireless quality measuring software. The wireless quality measuring unit 21 periodically measures the wireless quality of signals received from the base stations 3 using the specific communication protocol. The wireless communication unit 20 periodically sends a wireless quality signal indicating the measured wireless quality to the base stations 3.

In the following explanation, the wireless quality measuring software that causes the reconfigurable circuit 11 to measure the wireless quality of the signals received using the first communication protocol may also be referred to as "first communication protocol wireless quality measuring software". The wireless quality measuring software that causes the reconfigurable circuit 11 to measure the wireless quality of the signals received using the second communication protocol may also be referred to as "second communication protocol wireless quality measuring software".

The hardware configuration illustrated in FIG. 2 is merely an exemplary hardware configuration of the mobile station 2. Various hardware configurations of the mobile station 2 may be adopted to execute the processing in the following explanations.

Figure 3:
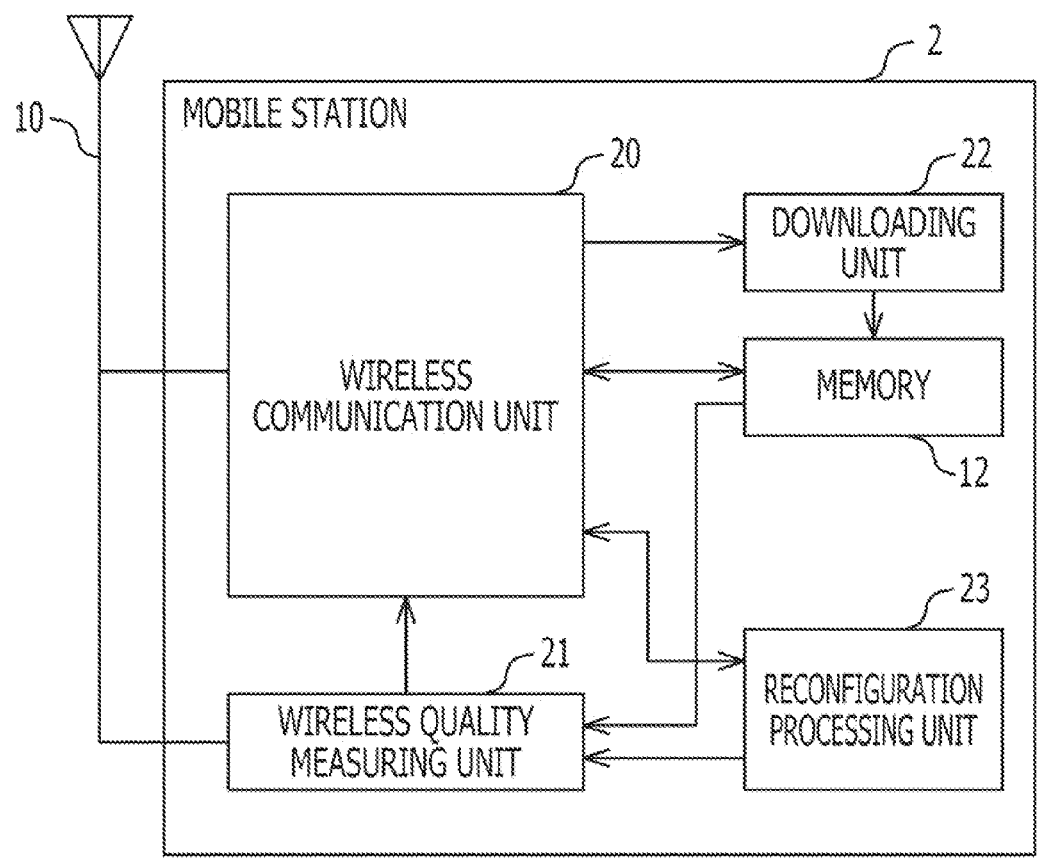
FIG. 3 illustrates an example configuration of a mobile station.

FIG. 3 illustrates an example configuration of the mobile station 2. Configuration elements similar to the configuration elements illustrated in FIG. 2 are indicated with the same reference numbers. The functions of the wireless communication unit 20 and the wireless quality measuring unit 21 are enabled according to the reconfiguration of the reconfigurable circuit 11 by the communication software and the wireless quality measuring software. Processing by a downloading unit 22 and a reconfiguration processing unit 23 are executed based on the controller 13 activating the program stored in the memory 12. FIG. 3 illustrates core functions relating to the explanation of the operations of the present embodiment.

The downloading unit 22 executes download processing to download the communication software and the wireless quality measuring software from the base stations 3. The downloading unit 22 stores the downloaded communication software and wireless quality measuring software in the memory 12.

When the wireless communication unit 20 receives a handover instruction to handover the mobile station 2 to the base station 3-2, the reconfiguration processing unit 23 inputs the second communication protocol communication software to be used after the handover and stored in the memory 12, to the reconfigurable circuit 11. The reconfiguration processing unit 23 outputs a reconfiguration instruction to the reconfigurable circuit 11. As a result, the reconfigurable circuit 11 is reconfigured by the inputted communication software.

The wireless quality measuring software is supplied by the base stations 3 while the mobile station 2 is connected to either of the base stations 3. When the downloading of the wireless quality measuring software is completed, the reconfiguration processing unit 23 inputs the wireless quality measuring software stored in the memory 12 to the reconfigurable circuit 11. The reconfiguration processing unit 23 outputs a reconfiguration instruction to the reconfigurable circuit 11. As a result, the reconfigurable circuit 11 is reconfigured by the inputted wireless quality measuring software.

Figure 4:
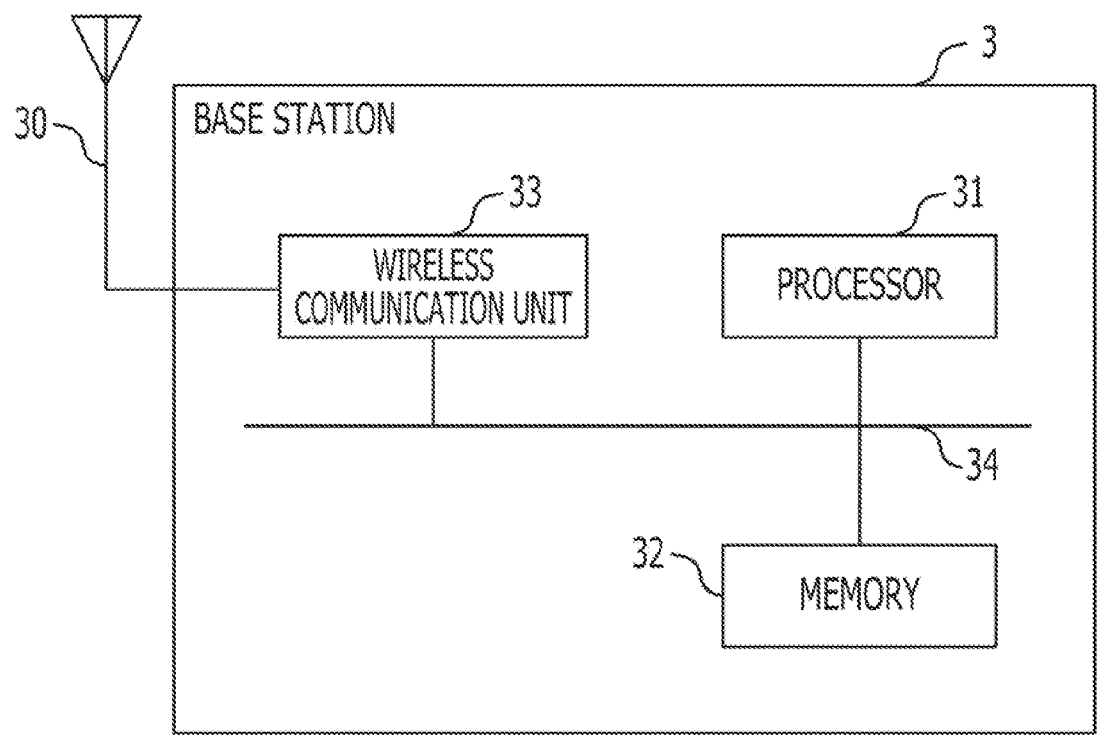
FIG. 4 illustrates an example hardware configuration of a base station.

A configuration of the base station 3 will be explained below. FIG. 4 illustrates an example hardware configuration of the base station 3. The base stations 3 each include an antenna 30, a processor 31, a memory 32, and a wireless communication unit 33. The processor 31, the memory 32, and the wireless communication unit 33 are interconnected by a bus 34 that transmits data.

The memory 32 stores data and computer programs for controlling the operations of the base stations 3. The memory 32 may include any of or all of a hard disc, a memory, and a non-volatile memory. The processor 31 is a data processing device and activates programs stored in the memory 32 and executes processing for controlling the operations of the base stations 3. The memory 32 stores programs being run by the processor 31 and stores data being temporarily used by the programs. The wireless communication unit 33 sends and receives wireless signals through the antenna 30 and executes wireless communication processing with the mobile station 2.

The hardware configuration illustrated in FIG. 4 is merely an exemplary hardware configuration of the base station 3. Various hardware configurations may be adopted for the base stations 3 to execute the processing in the following explanations.

Figure 5:
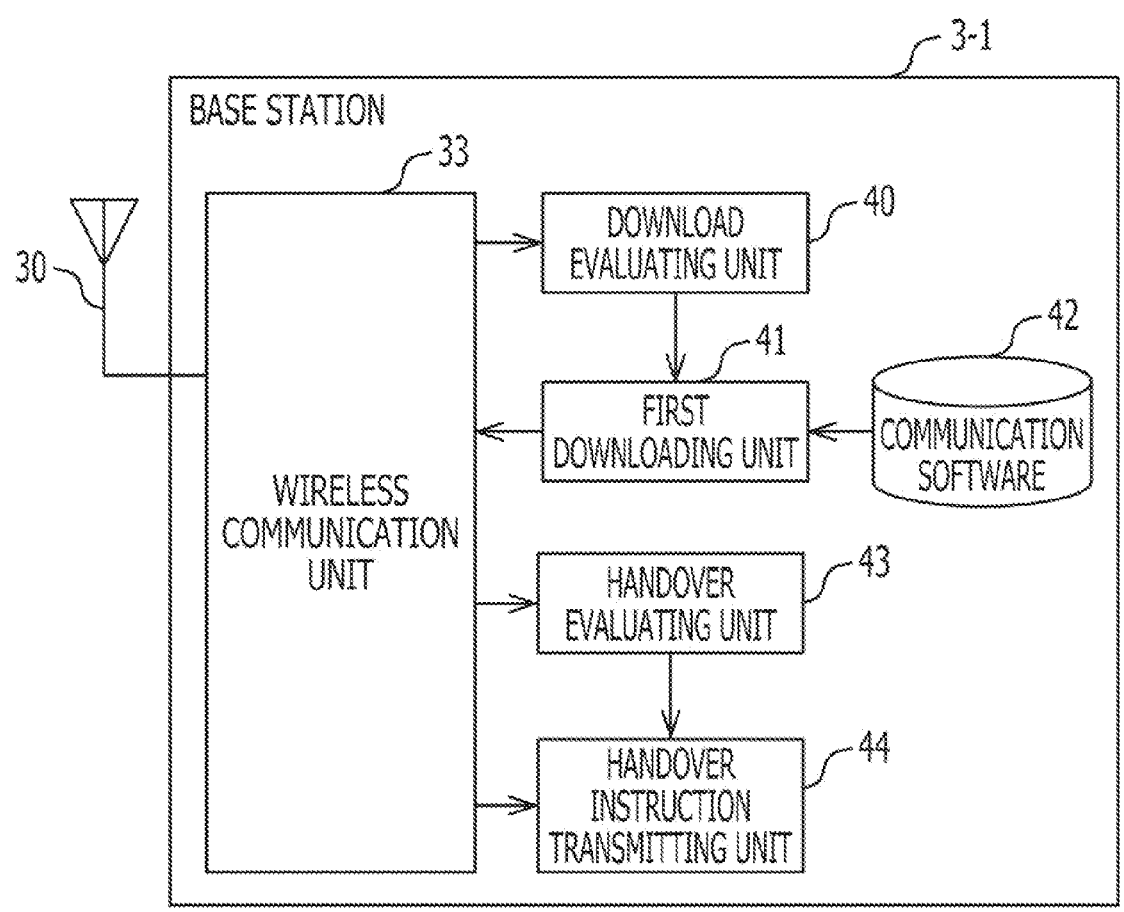
FIG. 5 illustrates an example of a first configuration of a base station.

FIG. 5 illustrates an example of a first configuration of the base station 3-1. Configuration elements similar to the configuration elements illustrated in FIG. 4 are indicated with the same reference numbers. Processing executed by the configuration elements in the base station 3-1 are implemented by the processor 31 executing the computer programs stored in the memory 32 illustrated in FIG. 4. FIG. 4 illustrates the core functions relating to the explanation of the operations of the present embodiment. Furthermore, the base station 3-2 has the same configuration.

The base station 3-1 includes the antenna 30, the wireless communication unit 33, a download evaluating unit 40, a first downloading unit 41, a handover evaluating unit 43, and a handover instruction transmitting unit 44. Communication software 42 may be stored, for example, in the memory 32.

The wireless communication unit 33 receives a wireless quality signal sent by the mobile station 2. The wireless communication unit 33 may receive a wireless quality signal that indicates a first wireless quality which is the wireless quality of a signal sent by the base station 3-1 using the first communication protocol and measured by the mobile station 2. The wireless communication unit 33 is an example of a first receiver described in the claims.

The download evaluating unit 40 determines whether or not the first wireless quality satisfies a specific first condition. The first condition may be a condition for detecting a reduction of the first wireless quality. The first condition may be, for example, a condition to be satisfied by the first wireless quality when the first wireless quality is equal to or less than a specific reference value.

The wireless communication unit 33 may receive a wireless quality signal indicating a second wireless quality for determining whether or not the first wireless quality satisfies the specific first condition, from the mobile station 2. The second wireless quality is the wireless quality of a signal sent by the base station 3-2 using a second communication protocol and measured by the mobile station 2. The first condition may be, for example, a condition to be satisfied when a difference between the first wireless quality and the second wireless quality is equal to or less than a specific reference value.

The first downloading unit 41 downloads the second communication protocol communication software 42 to the mobile station 2 if the first wireless quality satisfies the first condition.

The handover evaluating unit 43 determines whether or not the first wireless quality satisfies a specific second condition. The second condition may be a condition for detecting a reduction of the first wireless quality. The second condition may be a condition, for example, in which a second wireless quality equal to or less than a specific reference value satisfies the condition. The second condition may be, for example, a condition which is satisfied when a difference between the first wireless quality and the second wireless quality is equal to or less than the specific reference value.

The handover instruction transmitting unit 44 transmits, to the mobile station 2, a handover instruction signal to cause the mobile station 2 to be handed over to the base station 3-2 when first wireless quality satisfies the second condition. The abovementioned first condition and second condition are merely examples and other conditions for detecting a reduction in the first wireless quality may be adopted.

The first condition is set to be satisfied before the second condition when there is a reduction in the first wireless quality. For example, in the abovementioned evaluation method, the specific reference value used for the first condition evaluation may be set larger than the specific reference value used for the second condition evaluation. As a result, downloading of the second communication protocol communication software 42 is started before the handover.

Figure 6A:
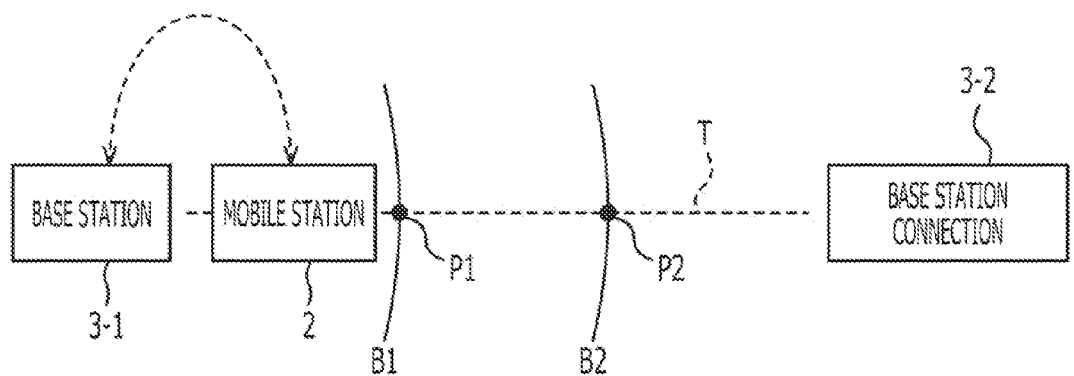
FIGS. 6A to 6C illustrate download periods and handover periods.
Figure 6B:
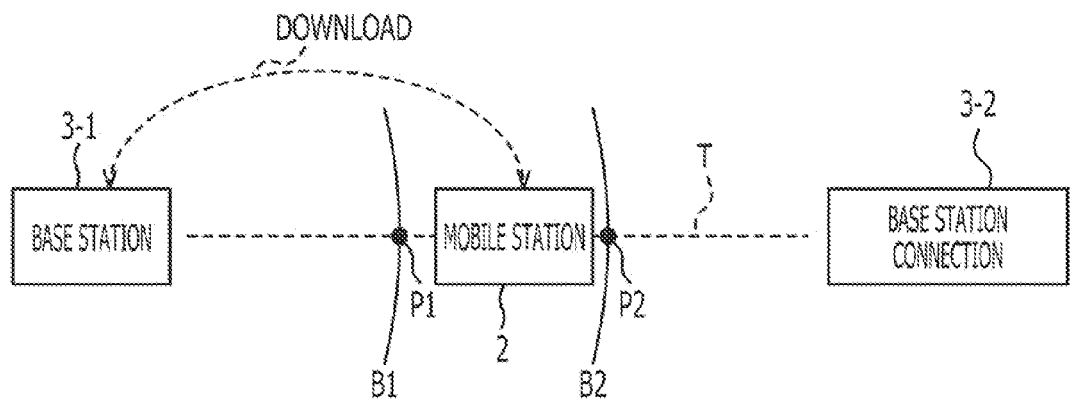
Figure 6C:
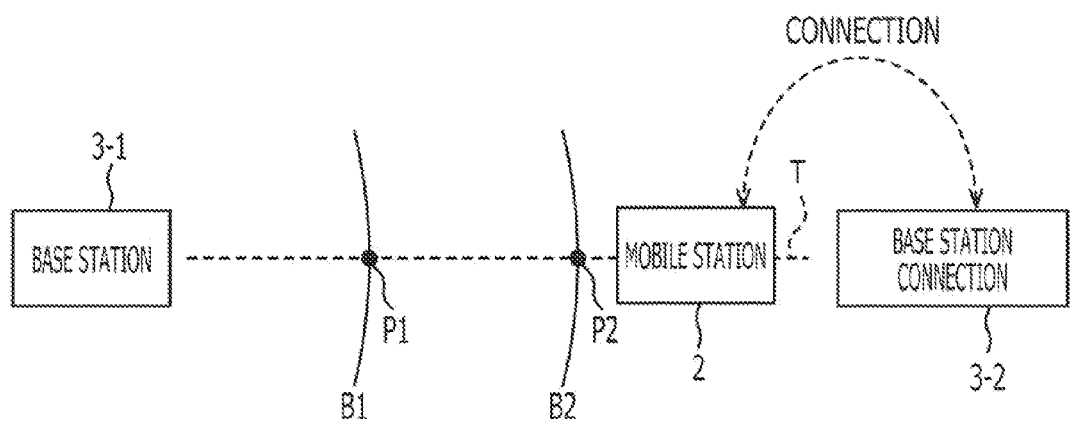

FIGS. 6A to 6C illustrate download periods and handover periods. Reference characters B1 and B2 indicate boundaries of spatial ranges where the first wireless quality satisfies the first and second conditions respectively. The reference character T indicates a path as the mobile station 2 moves away from the base station 3-1 and approaches the base station 3-2. The reference characters P1 and P2 indicate points where the mobile station 2 crosses the boundaries B1 and B2 respectively while moving along the path T.

In the state indicated in FIG. 6A, the mobile station 2 is located within the base station 3-1 coverage area and is connected to the base station 3-1. The mobile station 2 moves toward the base station 3-2 and crosses the point P1 as illustrated in FIG. 6B. At this time the first wireless quality satisfies the first condition. As a result, the base station 3-1 starts to download the second communication protocol communication software to the mobile station 2. In this state, the first wireless quality is relatively good and the downloading is executed in a reliable manner.

The mobile station 2 moves further toward the base station 3-2 and crosses the point P2 as illustrated in FIG. 6C. At this time the first wireless quality satisfies the second condition. As a result, the base station 3-1 sends the handover instruction signal to the mobile station 2. The mobile station 2 having received the handover instruction signal may quickly execute the handover processing after receiving the instruction since the first condition is appropriately set to allow for completion of the downloading of the communication software before the handover instruction.

The following is an explanation of processing executed by the base station 3-1. FIG. 7 illustrates a first example of processing by the base station 3-1. The operations in operations AA to AF may be steps in other embodiments.

In operation AA, the wireless communication unit 33 receives a wireless quality signal indicating a first wireless quality from the mobile station 2. The wireless communication unit 33 may receive a wireless signal indicating a second wireless quality along with the wireless quality signal indicating the first wireless quality.

In operation AB, the download evaluating unit 40 determines whether or not the first wireless quality satisfies the first condition. If the first wireless quality satisfies the first condition (operation AB: Y), the processing advances to operation AC. If the first wireless quality does not satisfy the first condition (operation AB: N), the processing returns to operation AA.

In operation AC, the first downloading unit 41 downloads the second communication protocol communication software to the mobile station 2. In operation AD, the wireless communication unit 33 receives the wireless quality signal indicating the first wireless quality from the mobile station 2. The wireless communication unit 33 may receive a wireless quality signal indicating a second wireless quality along with the wireless quality signal indicating the first wireless quality.

In operation AE, the handover evaluating unit 43 determines whether or not the first wireless quality satisfies the specific second condition. If the first wireless quality satisfies the second condition (operation AE: Y), the processing advances to operation AF. If the first wireless quality does not satisfy the second condition (operation AE: N), the processing returns to operation AD.

In operation AF, the handover instruction transmitting unit 44 transmits, to the mobile station 2, a handover instruction signal to cause the mobile station 2 to be handed over to the base station 3-2.

Figure 8:
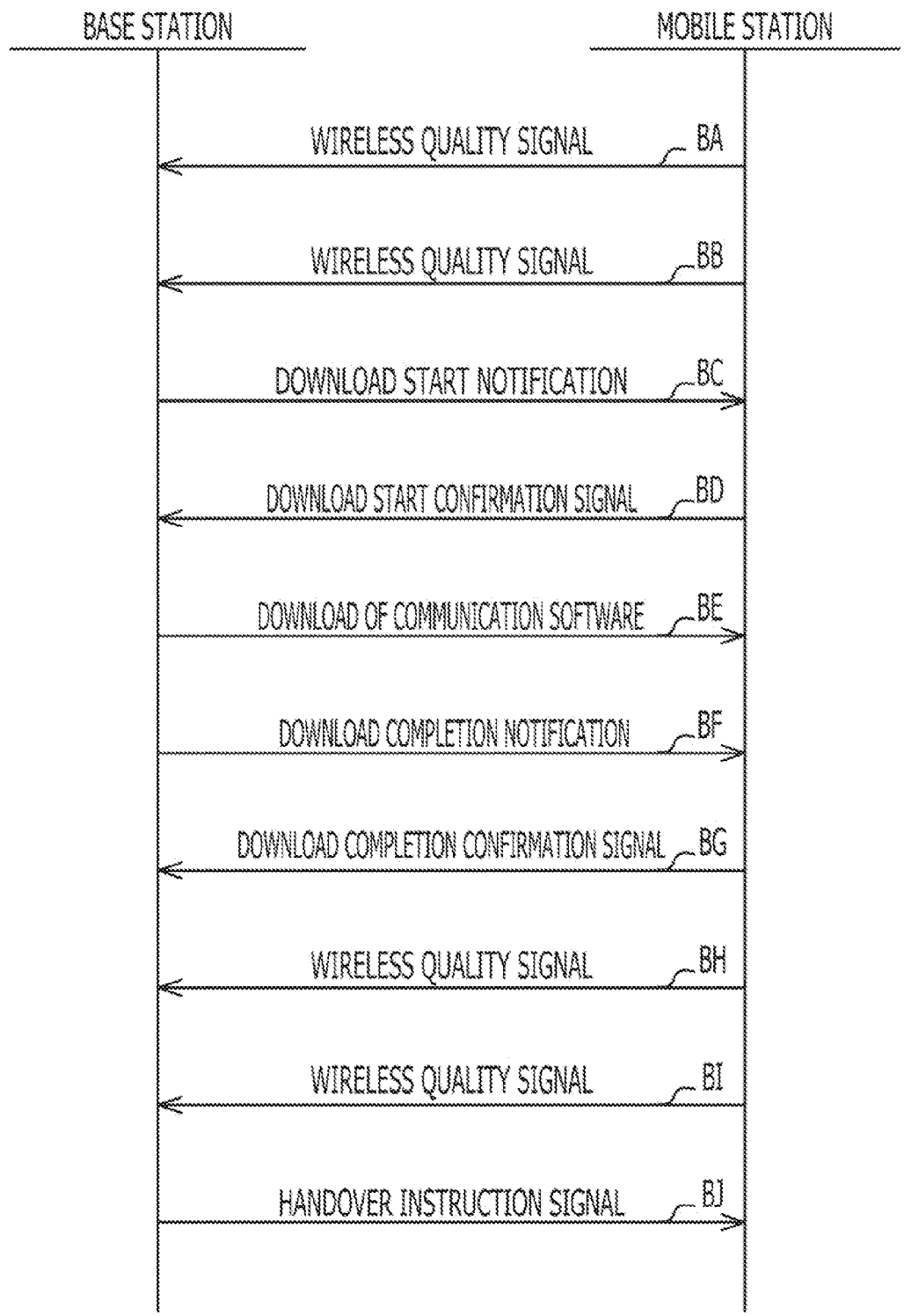
FIG. 8 illustrates a first example of a sequence of signals between the base station and the mobile station.

Next, the sequence of signals transmitted and received between the base station 3-1 and the mobile station 2 will be explained. FIG. 8 illustrates a first example of a sequence of signals between the base station 3-1 and the mobile station 2. The operations described in operations BA to BJ may be steps in other embodiments.

In operation BA, the wireless quality measuring unit 21 of the mobile station 2 measures the first wireless quality. The wireless communication unit 20 sends a wireless quality signal indicating the first wireless quality to the base station 3-1.

The wireless quality measuring unit 21 may also measure a second wireless quality along with the first wireless quality. The wireless communication unit 20 may also send a wireless quality signal indicating the second wireless quality to the base station 3-1. In the following operations BB, BH and BI, the measuring and transmitting of the second wireless quality may be executed along with the measuring and transmitting of the first wireless quality.

The download evaluating unit 40 of the base station 3-1 that received the wireless quality signal determines whether or not the first wireless quality satisfies the first condition. If the first condition is not satisfied at this time, downloading of the second communication protocol communication software is not started.

In operation BB, the wireless quality measuring unit 21 of the mobile station 2 measures the first wireless quality. The wireless communication unit 20 sends the wireless quality signal indicating the first wireless quality to the base station 3-1. The download evaluating unit 40 of the base station 3-1 that received the wireless quality signal determines whether or not the first wireless quality satisfies the first condition. If the first wireless quality does not satisfy the first condition at this time, downloading of the second communication protocol communication software is started.

In operation BC, the first downloading unit 41 of the base station 3-1 transmits a download start notification to the downloading unit 22 of the mobile station 2. In operation BD, the downloading unit 22 transmits a download start confirmation signal to confirm the start of the downloading, to the first downloading unit 41.

When the first downloading unit 41 receives the download start confirmation signal, the first downloading unit 41 downloads the second communication protocol communication software in operation BE.

When the downloading is completed, the first downloading unit 41 transmits a download completion notification to report the completion of the downloading, to the downloading unit 22 in operation BF. In operation BG, the downloading unit 22 transmits a download completion confirmation signal to confirm the completion of the downloading, to the first downloading unit 41.

In operation BH, the wireless quality measuring unit 21 of the mobile station 2 measures the first wireless quality. The wireless communication unit 20 sends the wireless quality signal indicating the first wireless quality to the base station 3-1. The download evaluating unit 40 of the base station 3-1 that received the wireless quality signal determines whether or not the first wireless quality satisfies the second condition. If the first wireless quality does not satisfy the second condition at this time, the handover instruction is not transmitted.

In operation BI, the wireless quality measuring unit 21 of the mobile station 2 measures the first wireless quality. The wireless communication unit 20 sends the wireless quality signal indicating the first wireless quality to the base station 3-1. The download evaluating unit 40 of the base station 3-1 that received the wireless quality signal determines whether or not the second wireless quality satisfies the second condition.

If the first and second conditions are satisfied, in operation BJ the handover instruction transmitting unit 44 transmits a handover instruction signal to the mobile station 2. When the mobile station 2 receives the handover instruction signal, the reconfiguration processing unit 23 of the mobile station 2 inputs the second communication protocol communication software stored in the memory 12 to the reconfigurable circuit 11. The reconfigurable circuit 11 is reconfigured by the second communication protocol communication software as a result of the reconfiguration processing unit 23 outputting the reconfiguration instruction to the reconfigurable circuit 11. The reconfigured wireless communication unit 20 executes wireless connection processing with the wireless communication unit 33 of the base station 3-2.

According to the present embodiment, downloading of the second communication protocol communication software to the mobile station 2 may be started before transmitting, to the mobile station 2, the handover instruction signal to cause the handover of the mobile station 2 to the base station 3-2. Thus, downloading may be completed while the radio wave conditions are relatively good. As a result, disconnections caused by download failures due to poor wireless quality and service interruptions due to delays in completing the downloading may be prevented.

The following is an explanation of other examples of processing executed by the base station 3-1. A suitable timing for starting the downloading depends on various causes that include variations in wireless states and movements of the mobile station 2. As a result, if parameters used for starting downloading in the first condition are fixed, the download starting time may be too early or too late. If downloading starts too early, the subsequent handover may not occur and thus the downloading would be wasteful.

Further, if downloading starts too early, a handover of the mobile station to a base station that is different from the expected base station may occur. The downloading then would be wasteful in this case as well. In the present embodiment, a reference value to be compared to the first wireless quality is changed sequentially based on wireless quality signals received sequentially from the mobile station 2.

Figure 9:
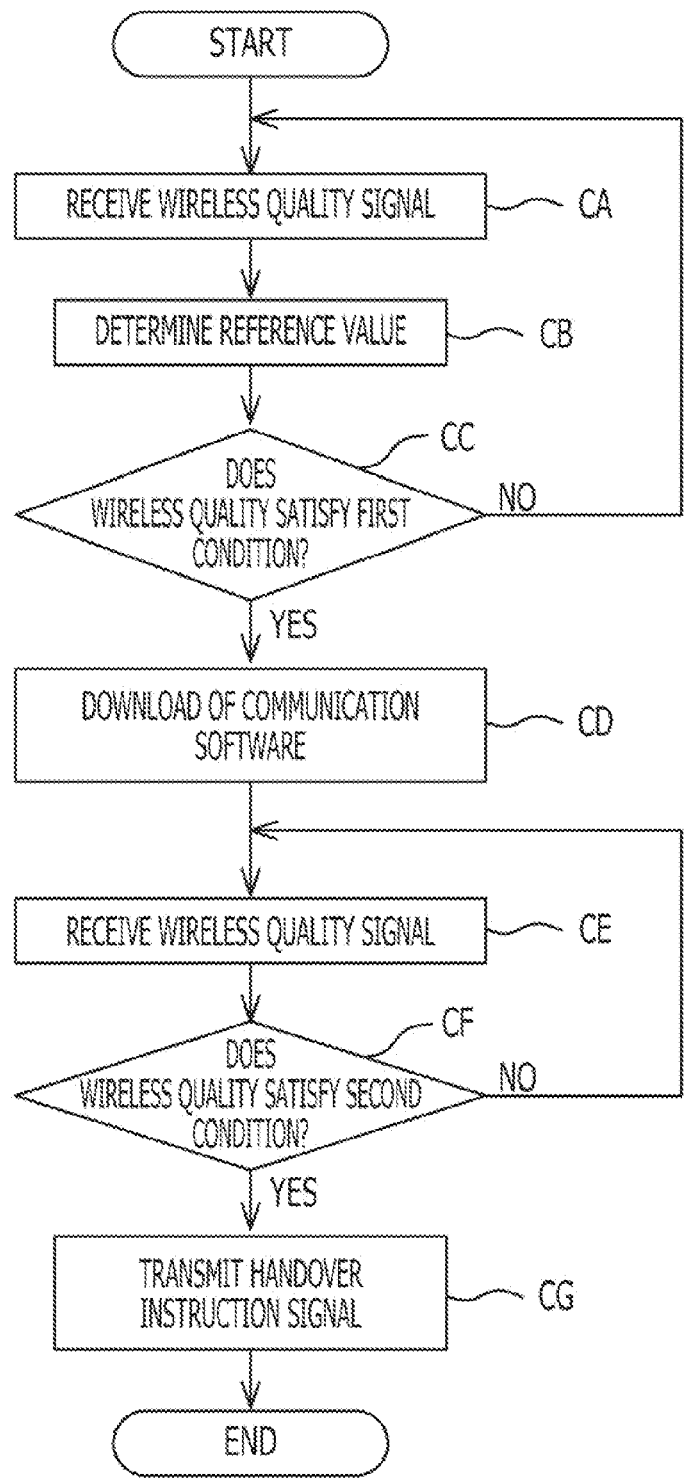
FIG. 9 illustrates a second example of processing by the base station.

FIG. 9 illustrates a second example of processing by the base station 3-1. The operations in operations CA to CG may be steps in other embodiments.

In operation CA, the wireless communication unit 33 receives the wireless quality signal indicating the first wireless quality from the mobile station 2. The wireless communication unit 33 may receive the wireless quality signal indicating the second wireless quality along with the wireless quality signal indicating the first wireless quality. In operation CB, the download evaluating unit 40 determines a reference value to be compared to the first wireless quality in the evaluation of the first condition.

Figure 10:
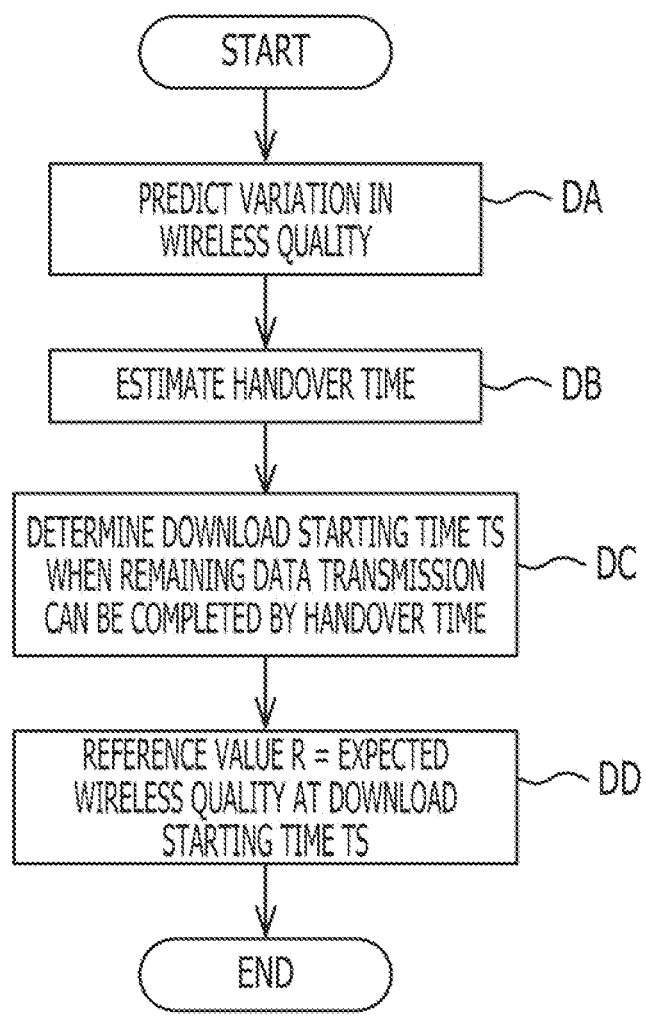
FIG. 10 illustrates an example of reference value determination processing.

FIG. 10 illustrates an example of reference value determination processing. The operations in operations DA to DD may be steps in other embodiments. In operation DA, the download evaluating unit 40 predicts variations in the first wireless quality that may subsequently occur based on variations in the first wireless quality received in the past.

Figure 11A:
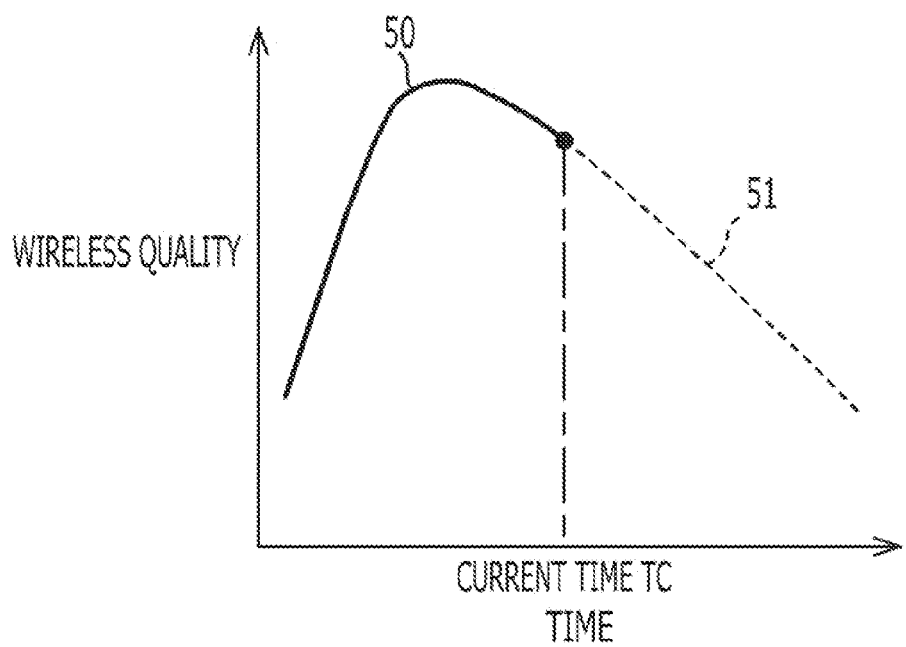
FIGS. 11A and 11B each illustrate an example of a reference value determination method.

FIG. 11A illustrates a first wireless quality variation 50 measured up to a certain time TC, and a first wireless quality variation 51 predicted from the time TC. The download evaluating unit 40 may also predict variations in the second wireless quality in the same way.

Figure 11B:
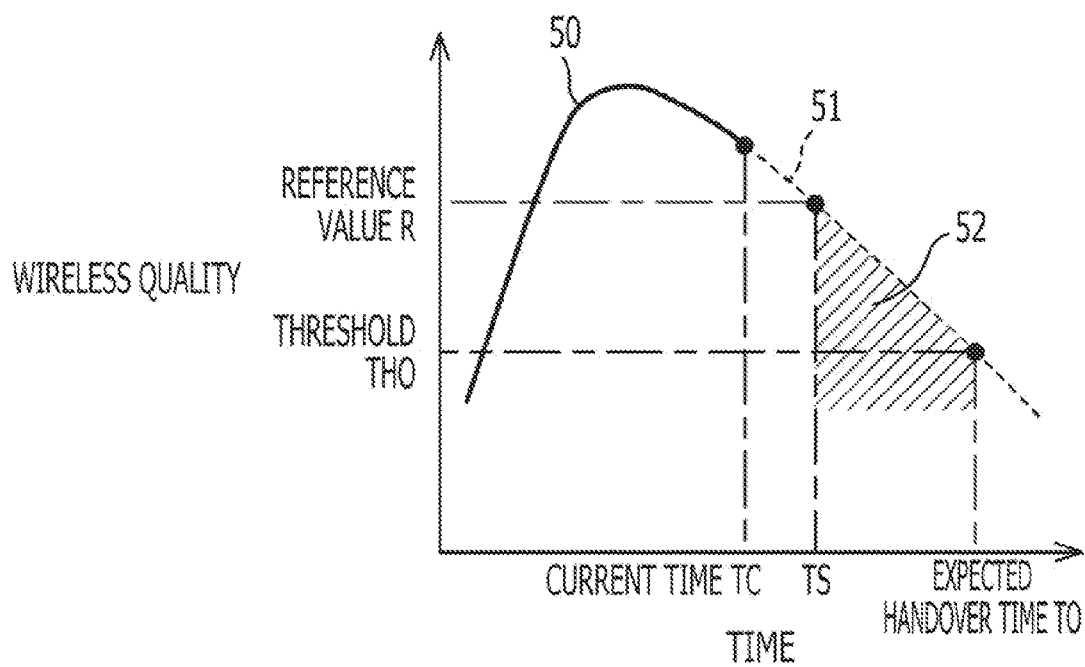

In operation DB, the download evaluating unit 40 estimates a handover time TO at which the handover is to occur. For example, the download evaluating unit 40 may estimate an expected time when the predicted first wireless quality is expected to satisfy the second condition as the handover time TO. FIG. 11B illustrates the handover time TO.

In operation DC, the download evaluating unit 40 determines a download starting time TS which is a time indicating when the downloading of a remaining portion of the communication software that has not been downloaded may be completed by the handover time TO, based on the predicted variation 51 in the first wireless quality. An amount of data that may be downloaded from the certain starting time TS when the downloading is started until the handover time TO, may be derived by calculating an integrated value 52 of the wireless quality in the period from the starting time TS to the handover time TO. In operation DD, the download evaluating unit 40 determines a predicted first wireless quality at the determined download starting time TS, as a reference value R.

Referring to FIG. 9, in operation CC, the download evaluating unit 40 determines whether or not the first wireless quality satisfies the first condition. The first condition may be, for example, a condition which is satisfied when the first wireless quality is equal to or less than the reference value R. The first condition may be, for example, a condition which is satisfied when a difference between the first wireless quality and the second wireless quality is equal to or less than the reference value R.

If the first wireless quality satisfies the first condition (operation CC: Y), the processing advances to operation CD. If the first wireless quality does not satisfy the first condition (operation CC: N), the processing returns to operation CA. In operation CD, the first downloading unit 41 downloads the second communication protocol communication software to the mobile station 2. The following operations CE to CG may be the same as the operations AD to AF illustrated in FIG. 7.

According to the present embodiment, starting conditions for starting the downloading may be associated with the variations in the wireless state and adjusted accordingly. As a result, the occurrence of downloading failures and wasted downloading may be reduced.

Wireless states may temporarily deteriorate and then recover. Therefore, handovers may not be executed even though the downloading has started. In this case, continuing the downloading after the wireless state has recovered is wasteful. In operation CD illustrated in FIG. 9, downloading may be interrupted when the first wireless quality does not satisfy the first condition during the downloading of the communication software.

Figure 12:
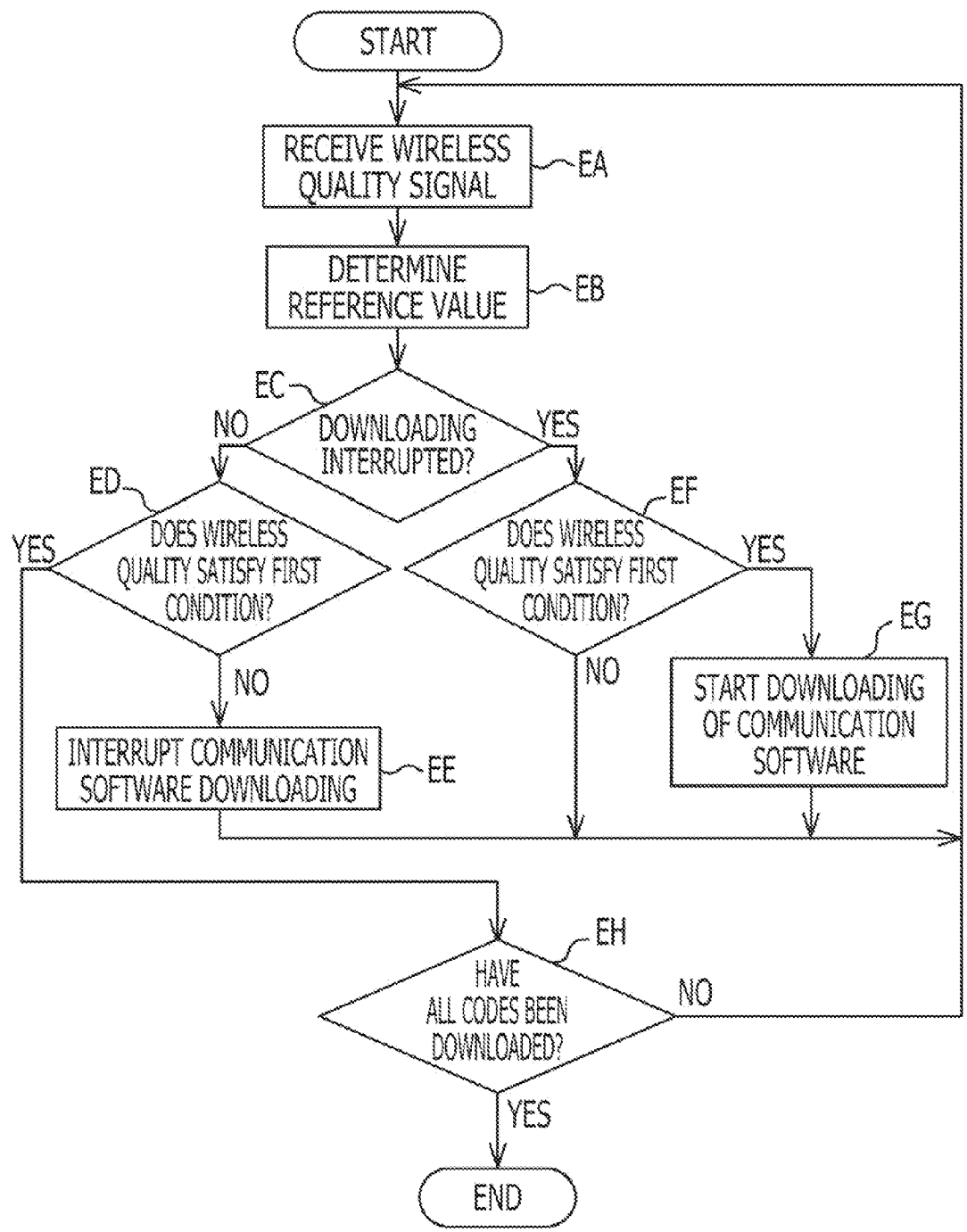
FIG. 12 illustrates a first example of download interruption processing.

FIG. 12 illustrates a first example of download interruption processing. The operations in operations EA to EH may be steps in other embodiments. In operation EA, the wireless communication unit 33 receives a wireless quality signal indicating the first wireless quality from the mobile station 2. The wireless communication unit 33 may receive a wireless signal indicating a second wireless quality along with the wireless quality signal indicating the first wireless quality.

In operation EB, the download evaluating unit 40 determines the reference value to be compared to the first wireless quality in the evaluation of the first condition. The download evaluating unit 40 may determine the reference value in the same way as operation CB illustrated in FIG. 9. In operation CE, the download evaluating unit 40 determines whether or not the current downloading of the communication software has been interrupted. If the downloading has not been interrupted (operation EC: N), the processing advances to operation ED. If the downloading has been interrupted (operation EC: Y), the processing advances to operation EF.

In operation ED, the download evaluating unit 40 evaluates whether or not the first wireless quality satisfies the first condition. If the first wireless quality satisfies the first condition (operation ED: Y), the processing advances to operation EH. If the first wireless quality does not satisfy the first condition (operation ED: N), the processing advances to operation EE. In operation EE, the first downloading unit 41 interrupts the downloading. Then, the processing returns to operation EA.

In operation EF, the download evaluating unit 40 determines whether or not the first wireless quality satisfies the first condition. If the first wireless quality satisfies the first condition (operation EF: Y), the processing advances to operation EG. If the first wireless quality does not satisfy the first condition (operation EF: N), the processing returns to operation EA. In operation EG, the first downloading unit 41 restarts the downloading. Next, the processing returns to operation EA.

In operation EH, the first downloading unit 41 determines whether or not all the codes of the communication software being downloaded were downloaded. If all the codes were downloaded (operation EH: Y), the first downloading unit 41 terminates the downloading. If all the codes have not been downloaded (operation EH: N), the processing returns to operation EA.

Figure 13:
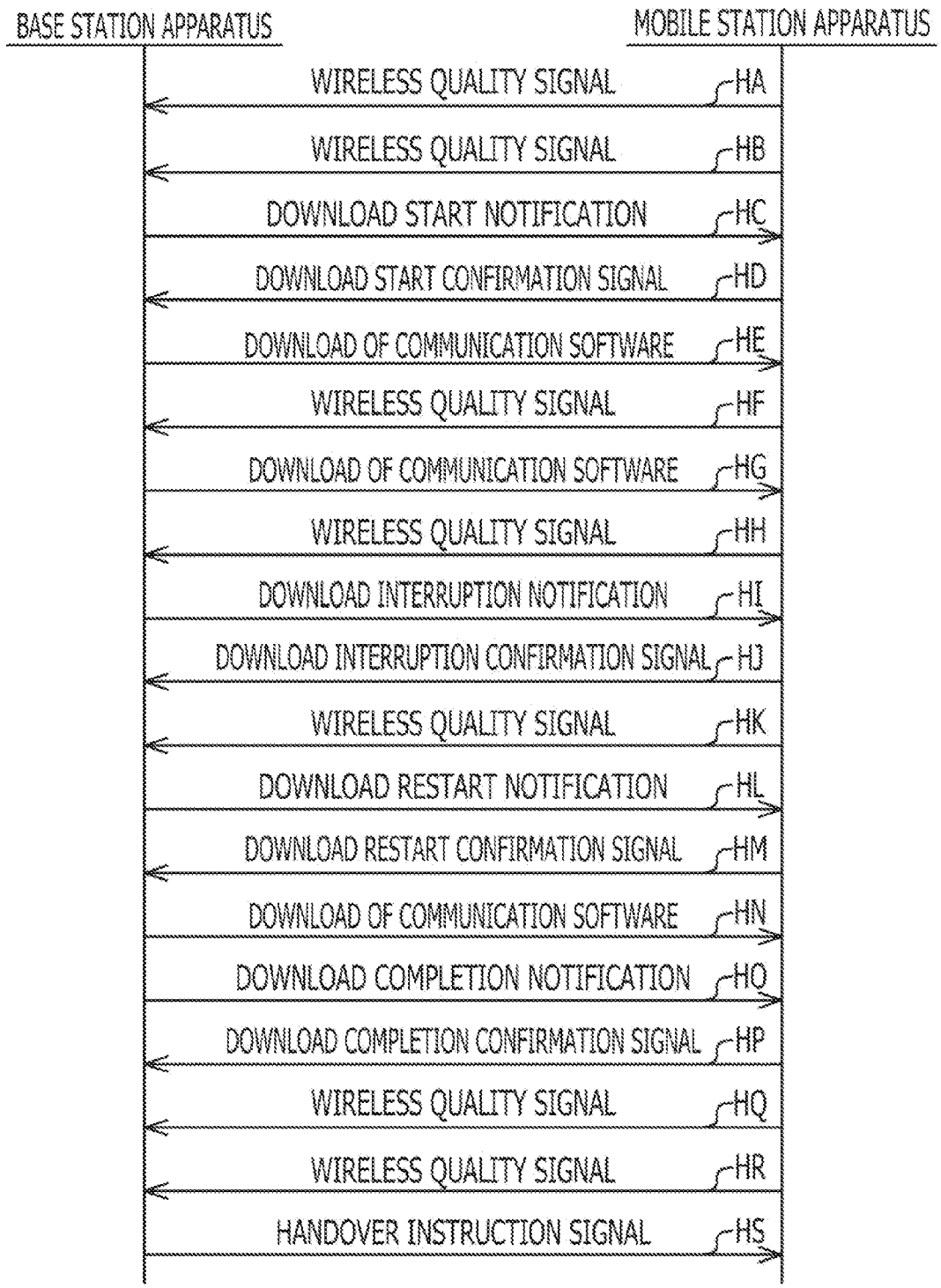
FIG. 13 illustrates a second example of a sequence of signals between the base station and the mobile station.

Next, the sequence of signals transmitted and received between the base station 3-1 and the mobile station 2 when the downloading is interrupted will be explained. FIG. 13 illustrates a second example of a sequence of signals between the base station 3-1 and the mobile station 2. The operations in operations HA to HS may be steps in other embodiments.

In operation HA, the wireless quality measuring unit 21 of the mobile station 2 measures the first wireless quality. The wireless communication unit 20 sends the wireless quality signal indicating the first wireless quality to the base station 3-1.

The wireless quality measuring unit 21 may also measure the second wireless quality along with the first wireless quality. The wireless communication unit 20 may also send a wireless quality signal indicating the second wireless quality to the base station 3-1. In the following operations HB, HF, HH, HK, HQ, and HR, the measuring and transmitting of the second wireless quality may be executed along with the measuring and transmitting of the first wireless quality.

Processing in operations HB to HD is the same processing executed in operations BB to BD illustrated in FIG. 8. In operation HE, the first downloading unit 41 starts the downloading of the second communication protocol communication software.

In operation HF, the wireless quality measuring unit 21 of the mobile station 2 measures the first wireless quality. The wireless communication unit 20 sends the wireless quality signal indicating the first wireless quality to the base station 3-1. The download evaluating unit 40 of the base station 3-1 that received the wireless quality signal determines whether or not the first wireless quality satisfies the first condition. If the first wireless quality satisfies the first condition at this time, the downloading in operation HG is continued.

In operation HH, the wireless quality measuring unit 21 of the mobile station 2 measures the first wireless quality. The wireless communication unit 20 sends a wireless quality signal indicating the first wireless quality to the base station 3-1. The download evaluating unit 40 of the base station 3-1 that received the wireless quality signal determines whether or not the first wireless quality satisfies the first condition.

If the first wireless quality does not satisfy the first condition at this time, the first downloading unit 41 of the base station 3-1 transmits a download interruption notification to the downloading unit 22 of the mobile station 2 in operation HI. In operation HJ, the downloading unit 22 transmits a download interruption confirmation signal to confirm the interruption of the downloading, to the first downloading unit 41.

In operation HK, the wireless quality measuring unit 21 of the mobile station 2 measures the first wireless quality. The wireless communication unit 20 sends a wireless quality signal indicating the first wireless quality to the base station 3-1. The download evaluating unit 40 of the base station 3-1 that received the wireless quality signal determines whether or not the first wireless quality satisfies the first condition.

If the first wireless quality satisfies the first condition at this time, the first downloading unit 41 of the base station 3-1 transmits a download restart notification to the downloading unit 22 of the mobile station 2 in operation HL. In operation HM, the downloading unit 22 transmits a download restart confirmation signal to confirm the download restart notification, to the first downloading unit 41.

When the first downloading unit 41 receives the download restart confirmation signal, the first downloading unit 41 restarts the downloading in operation HN. The subsequent processing of the operations HO to HS is the same as the processing of the operations BF to BJ illustrated in FIG. 8.

According to the present embodiment, downloading may be interrupted when the wireless state recovers after starting to download the communication software. As a result, wasteful downloading that occurs when a handover is not executed after starting downloading may be prevented.

Figure 14:
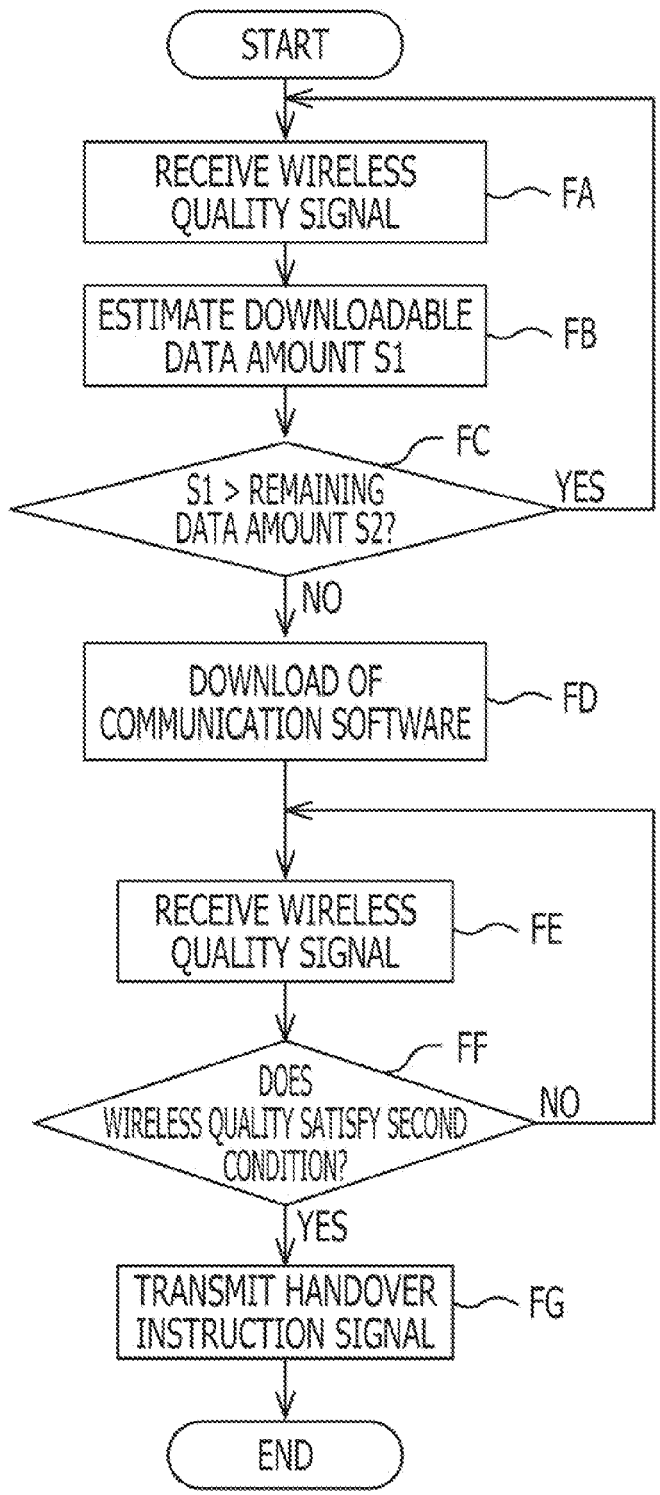
FIG. 14 illustrates a third example of processing by the base station.

The following is an explanation of other processing executed by the base station 3-1. FIG. 14 illustrates a third example of processing by the base station 3-1. According to the present embodiment, starting conditions for starting the downloading may be associated with variations in the wireless state and adjusted accordingly. The operations in operations FA to FG in the present embodiment may be steps in other embodiments.

In operation FA, the wireless communication unit 33 receives a wireless quality signal indicating the first wireless quality from the mobile station 2. The wireless communication unit 33 may also receive a wireless signal indicating the second wireless quality along with the wireless quality signal indicating the first wireless quality.

In operation FB, the download evaluating unit 40 predicts a handover occurring time HO and estimates a data amount S1 that may be downloaded from the current time to the time HO. The methods for predicting the time HO and estimating the data amount S1 may be similar to the methods explained in reference to FIGS. 10, 11A, and 11B.

In operation FB, the download evaluating unit 40 determines whether or not the downloadable data amount S1 is larger than an amount S2 of the remaining portion of communication software that has not been downloaded yet. Since the data amount S1 is a value that changes according to the first wireless quality, the negative equation response (S1≤S2) for the determining equation (S1>S2) in operation FB may be raised as an example of the first condition described in the claims.

When S1 is larger than S2 (operation FC: Y), the processing returns to operation FA. When S1 is not larger than S2 (operation FC: N), the processing advances to operation FD.

In operation FD, the first downloading unit 41 downloads the second communication protocol communication software to the mobile station 2. The following operations FE to FG may be the same as the operations AD to AF illustrated in FIG. 7.

According to the present embodiment, starting conditions for starting the downloading may be associated with variations in the wireless state and adjusted accordingly. As a result, the occurrence of downloading failures and wasted downloading may be reduced.

Figure 15:
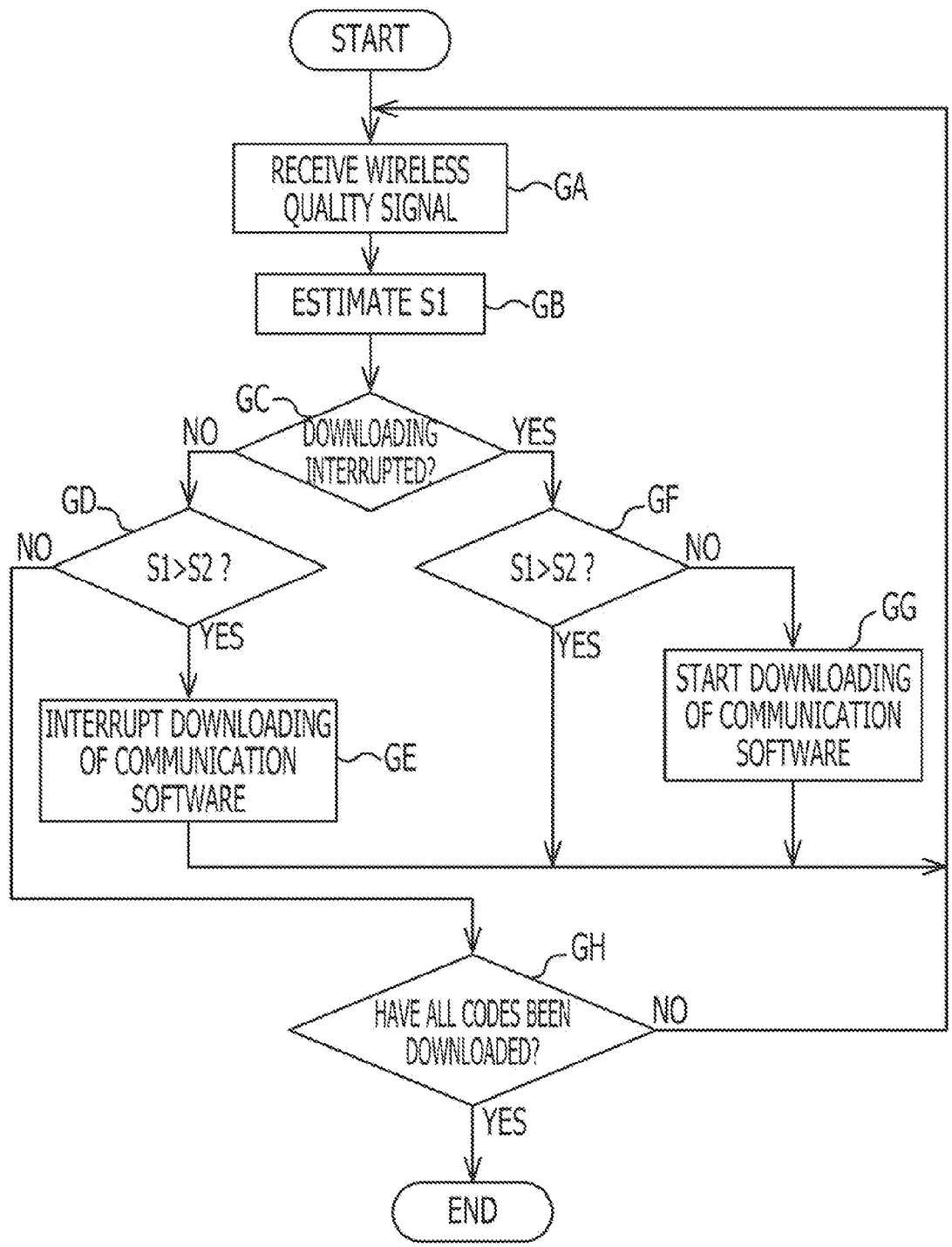
FIG. 15 illustrates a second example of download interruption processing.

Downloading may be interrupted in the processing illustrated in FIG. 14 when the wireless state recovers during the downloading of the communication software. FIG. 15 illustrates a second example of download interruption processing. The operations in operations GA to GH may be steps in other embodiments.

In operation GA, the wireless communication unit 33 receives a wireless quality signal indicating the first wireless quality from the mobile station 2. The wireless communication unit 33 may also receive a wireless quality signal indicating the second wireless quality along with the wireless quality signal indicating the first wireless quality.

In operation GB, the download evaluating unit 40 estimates the downloadable data amount S1. In operation GC, the download evaluating unit 40 determines whether or not the current downloading of the communication software has been interrupted. If the downloading has not been interrupted (operation GC: N), the processing advances to operation GD. If the downloading has been interrupted (operation GC: Y), the processing advances to operation GF.

In operation GD, the download evaluating unit 40 determines whether or not the downloadable data amount S1 is larger than the amount S2 of the remaining portion of the communication software that has not been downloaded yet. When S1 is not larger than S2 (operation GD: N), the processing advances to operation GH. When S1 is larger than S2 (operation GD: Y), the processing advances to operation GE. In operation GE, the first downloading unit 41 interrupts the downloading. Then the processing returns to operation GA.

In operation GF, the download evaluating unit 40 determines whether or not S1 is larger than S2. When S1 is not larger than S2 (operation GD: N), the processing advances to operation GG. When S1 is larger than S2 (operation GD: Y), the processing returns to operation GA. In operation GG, the first downloading unit 41 restarts the downloading. Then the processing returns to operation GA.

In operation GH, the first downloading unit 41 determines whether or not all the codes of the communication software being downloaded were downloaded. If all the codes were downloaded (operation GH: Y), the first downloading unit 41 terminates the downloading. If all the codes were not downloaded (operation GH: N), the processing returns to operation GA.

According to the present embodiment, downloading may be interrupted when the wireless state recovers after starting to download the communication software. In this way, wasteful downloading may be prevented.

Another embodiment of the base station 3-1 will be explained below. When the mobile station 2 is connected to the base station 3-1, the mobile station 2 measures the quality of transmission signals from a base station adjacent to the base station 3-1 instead of the transmission signals from the base station 3-1. The base station 3-1 receives the measurement results from the mobile station 2 and determines the communication protocol to be used by the mobile station 2 when, for example, the mobile station 2 is handed over to the adjacent base station, based on the measurement results.

When multiple base stations are using different communication protocols and therefore there are multiple communication protocol candidates for use after the handover, the mobile station 2 holds wireless quality measuring software of multiple communication protocols. Increases in the number of communication protocol candidates may lead to increases in the scale of hardware and the electric power consumption of the mobile station 2.

The base station 3-1 according to the present embodiment downloads the wireless quality measuring software to the mobile station 2 when the mobile station 2 starts connection to the base station 3-1. The downloaded wireless quality measuring software includes wireless quality measuring software for measuring the wireless quality of signals received using the communication protocol used by the base station adjacent to the base station 3-1.

Figure 16:
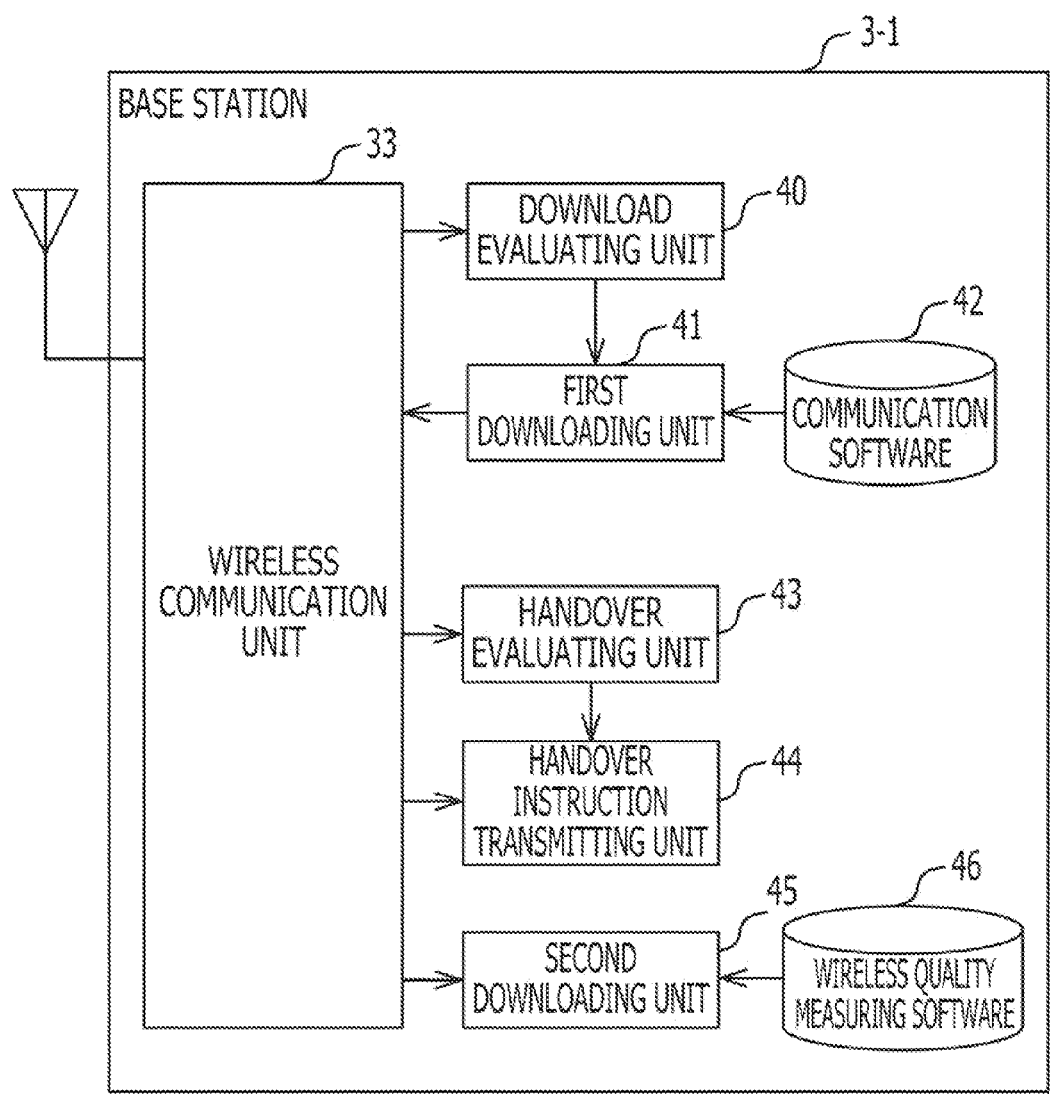
FIG. 16 illustrates an example of a second configuration of the base station.

FIG. 16 illustrates an example of a second configuration of the base station 3-1. Configuration elements similar to the configuration elements illustrated in FIG. 5 are indicated with the same reference numbers. Processing executed by the configuration elements in the base station 3-1 is implemented by the processor 31 activating the computer programs stored in the memory 32 illustrated in FIG. 4. FIG. 5 illustrates the core functions relating to the explanation of the operations of the present embodiment. Furthermore, the base station 3-2 has the same configuration.

The base station 3-1 includes a second download unit 45 along with the other configuration elements illustrated in FIG. 5. The memory 32 illustrated in FIG. 4 may store wireless quality measuring software 46 used by the mobile station 2 for measuring the wireless quality of signals received using the communication protocol used by the base station adjacent to the base station 3-1. In the explanation below, the base station adjacent to the base station 3-1 may also be referred to as the base station 3-2.

When the connection between the mobile station 2 and the base station 3-1 is started, the second downloading unit 45 downloads the wireless quality measuring software used for the communication protocol to the mobile station 2. The wireless communication unit 33 receives, from the mobile station 2, signals indicating the second wireless quality measured due to the activation of a second communication protocol wireless quality measuring program by the reconfigurable circuit 11 of the mobile station 2.

The download evaluating unit 40 evaluates whether or not the communication protocol of the base station 3-2, which is the target for the handover of the mobile station 2 from the base station 3-1, is the second communication protocol based on the second wireless quality.

Figure 17:
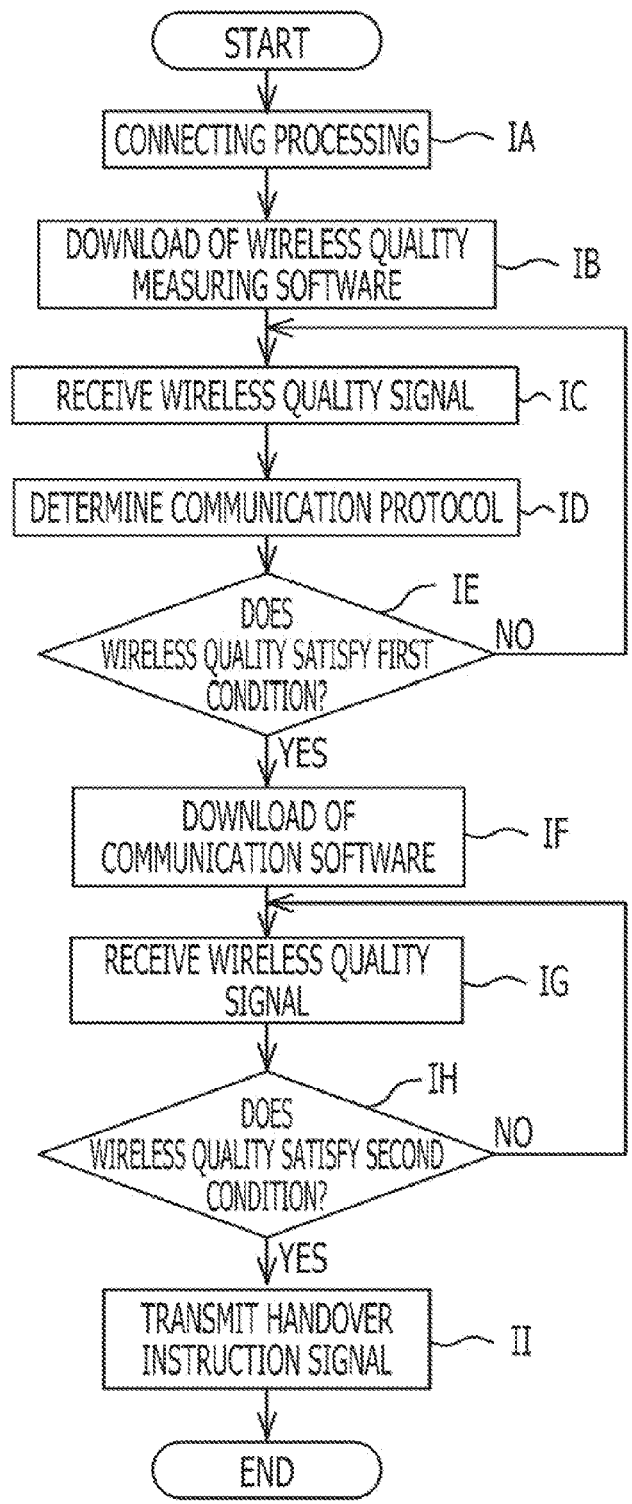
FIG. 17 illustrates a fourth example of processing by the base station.

FIG. 17 illustrates a fourth example of processing by the base station 3-1 illustrated in FIG. 16. The operations in operations IA to II may be steps in other embodiments. In operation IA, the wireless communication unit 33 of the base station 3-1 executes wireless communication connection processing with the wireless communication unit 20 of the mobile station 2.

In operation IB, the second downloading unit 45 downloads the wireless quality measuring software of the first communication protocol and the wireless quality measuring software of the second communication protocol to the mobile station 2. In operation IC, the wireless communication unit 33 receives wireless quality signals indicating the first wireless quality and the second wireless quality from the mobile station 2.

In operation ID, the download evaluating unit 40 determines the communication protocol of the base station that is the target of the handover of the mobile station 2 from the base station 3-1. Therefore, evaluation is executed to determine whether or not the communication protocol of the base station that is the target of the handover of the mobile station 2 from the base station 3-1, is the second communication protocol.

In operation IE, the download evaluating unit 40 determines whether or not the first wireless quality satisfies the first condition. If the first wireless quality satisfies the first condition (operation IE: Y), the processing advances to operation IF. If the first wireless quality does not satisfy the first condition (operation IE: N), the processing returns to operation IC.

In operation IF, the first downloading unit 41 downloads the communication protocol communication software determined in operation ID, to the mobile station 2. The processing in operations IG to II is similar to the processing in operations AD to AF illustrated in FIG. 7.

A part of the processing illustrated in FIG. 17 may be switched with a part of the processing in other embodiments in regard to the embodiments of the base station 3-1 illustrated in FIG. 16.

Figure 18:
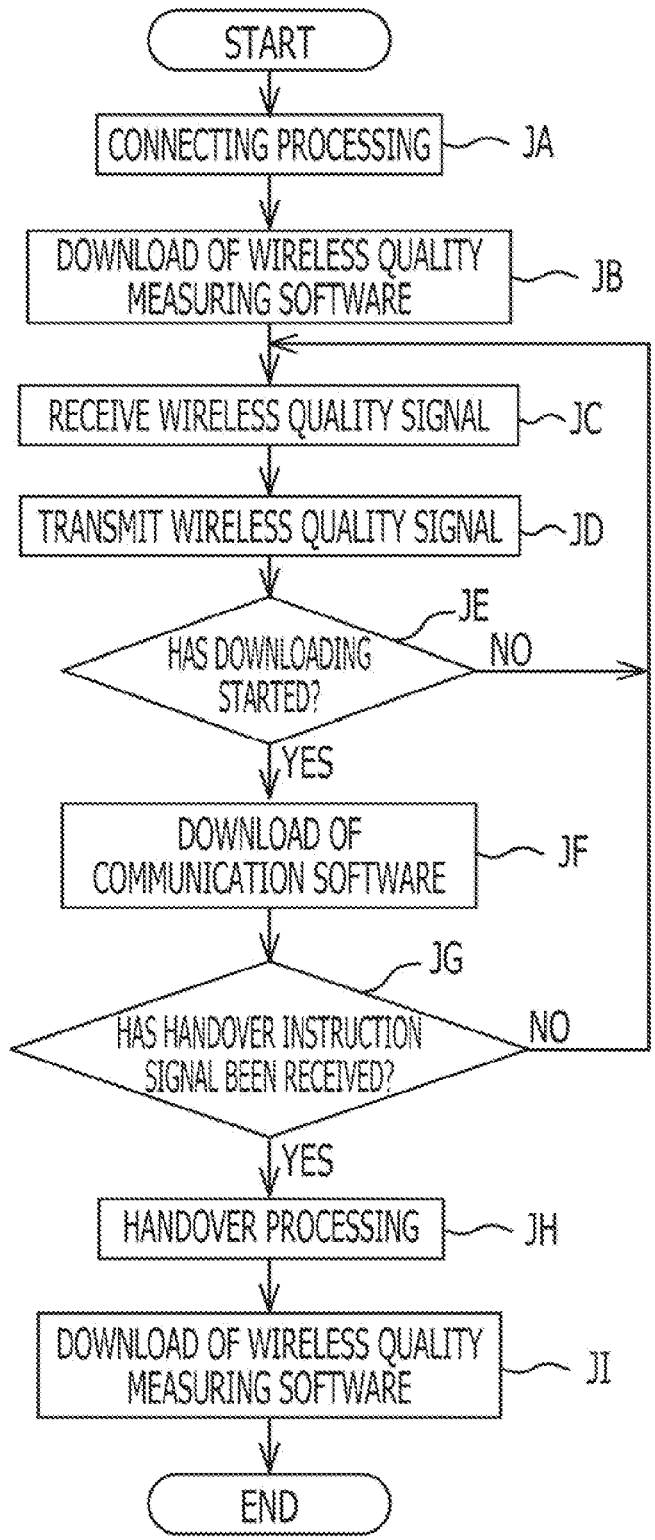
FIG. 18 illustrates an example of processing by the mobile station.

FIG. 18 illustrates an example of processing by the mobile station 2. The operations in operations JA to JI may be steps in other embodiments. In operation JA, the wireless communication unit 20 of the mobile station 2 executes wireless communication connection processing with the wireless communication unit 33 of the base station 3-1.

In operation JB, the downloading unit 22 downloads the wireless quality measuring software of the first communication protocol and the wireless quality measuring software of the second communication protocol from the base station 3-1. The downloaded wireless quality measuring software is stored in the memory 12.

In operation JC, the wireless quality measuring unit 21 measures the first wireless quality of the signals received from the base station 3-1 using the first communication protocol. The wireless quality measuring unit 21 measures the second wireless quality of the signals received from the base station 3-2 using the second communication protocol. In operation JD, the wireless communication unit 20 transmits the wireless quality signals indicating the measured first and second wireless quality to the base stations 3.

In operation JE, the downloading unit 22 determines whether or not the base station 3-1 has started downloading the second communication protocol communication software. When the downloading has started (operation JE: Y), the processing advances to operation JF. If the downloading has not started (operation JE: N), the processing returns to operation JC. In operation JF, the downloading unit 22 downloads the second communication protocol communication software. The downloaded second communication protocol communication software is stored in the memory 12.

In operation JG, the wireless communication unit 20 determines whether or not a handover instruction to handover the mobile station 2 to the base station 3-2 has been received. If the handover instruction has been received (operation JG: Y), the processing advances to operation JH. If the handover instruction has not been received (operation JG: N), the processing returns to operation JC.

In operation JH, the wireless communication unit 20 executes the handover processing to handover the mobile station 2 from the base station 3-1 to the base station 3-2. The reconfiguration processing unit 23 inputs the second communication protocol communication software stored in the memory 12 to the reconfigurable circuit 11. The reconfigurable circuit 11 is reconfigured by the second communication protocol communication software as a result of the reconfiguration processing unit 23 outputting a reconfiguration instruction to the reconfigurable circuit 11. The reconfigured wireless communication unit 20 executes wireless communication connection processing with the wireless communication unit 33 of the base station 3-2.

In operation JI, the downloading unit 22 downloads the wireless quality measuring software from the base station 3-2. The downloaded wireless quality measuring software includes wireless quality measuring software for measuring signals received using the communication protocol used by a base station adjacent to the base station 3-2. The downloaded wireless quality measuring software is stored in the memory

12. When the downloading is completed, the reconfiguration processing unit 23 inputs the wireless quality measuring software stored in the memory 12 into the reconfigurable circuit 11. The reconfigurable circuit 11 is reconfigured by the wireless quality measuring software as a result of the reconfiguration processing unit 23 outputting the reconfiguration instruction to the reconfigurable circuit 11.

Figure 19:
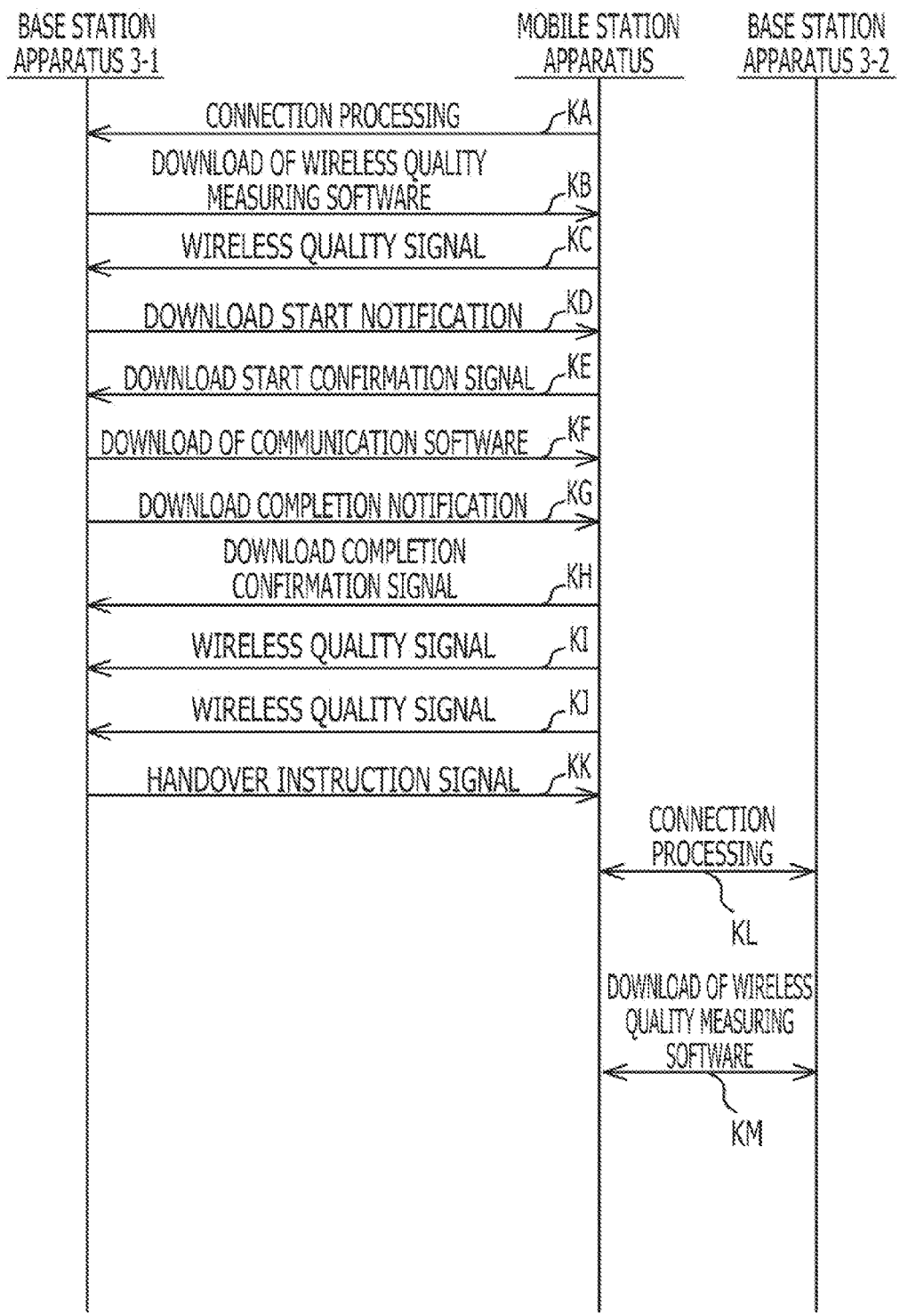
FIG. 19 illustrates a third example of a sequence of signals between the base station and the mobile stations.

FIG. 19 illustrates an example of a sequence of signals between the base station 2 and the mobile station 3-1 and between the base station 2 and the mobile station 3-2. The operations in operations KA to KJ may be steps in other embodiments.

In operation KA, the wireless communication unit 20 of the mobile station 2 and the wireless communication unit 33 of the base station 3-1 execute wireless communication connection processing between the mobile station 2 and the base station 3-1. In operation KB, the second downloading unit 45 of the base station 3-1 downloads the wireless quality measuring software of the first communication protocol and the wireless quality measuring software of the second communication protocol to the mobile station 2.

In operation KC, the wireless quality measuring unit 21 of the mobile station 2 measures the first wireless quality and the second wireless quality. The wireless communication unit 20 sends wireless quality signals indicating the first wireless quality and the second wireless quality to the base station 3-1.

Operations KD to KK are similar to the operations BC to BJ illustrated in FIG. 8. In operation KL, the wireless communication unit 20 of the mobile station 2 and the wireless communication unit 33 of the base station 3-2 execute wireless communication connection processing. In operation KM, the second downloading unit 45 of the base station 3-2 downloads the wireless quality measuring software to the mobile station 2. After the downloading is completed, the reconfiguration processing unit 23 reconfigures the reconfigurable circuit 11.

According to the present embodiment, the wireless quality measuring software used in the processing to cause the mobile stations to be handed over to the base stations 3 is downloaded when the mobile station 2 is connected to the base stations 3. As a result, the amount of the software to be held in the mobile station 2 is reduced in comparison to when the mobile station 2 holds in advance all the types of wireless quality measuring software for the communication protocols that may be used. As a result, the scale of the circuitry and the electrical power consumption of the mobile station 2 may be reduced.

Also according to the present embodiment, the wireless quality measuring software is downloaded at a timing that is different than the timing of downloading the communication software. In other words, the wireless quality measuring software used during the connection with the base station 3-1 is downloaded during the connection with the base station 3-1. Conversely, the communication software used during the connection with the base station 3-1 is downloaded to the mobile station 2 before the mobile station 2 is handed over to the base station 3-1.

Figure 20:
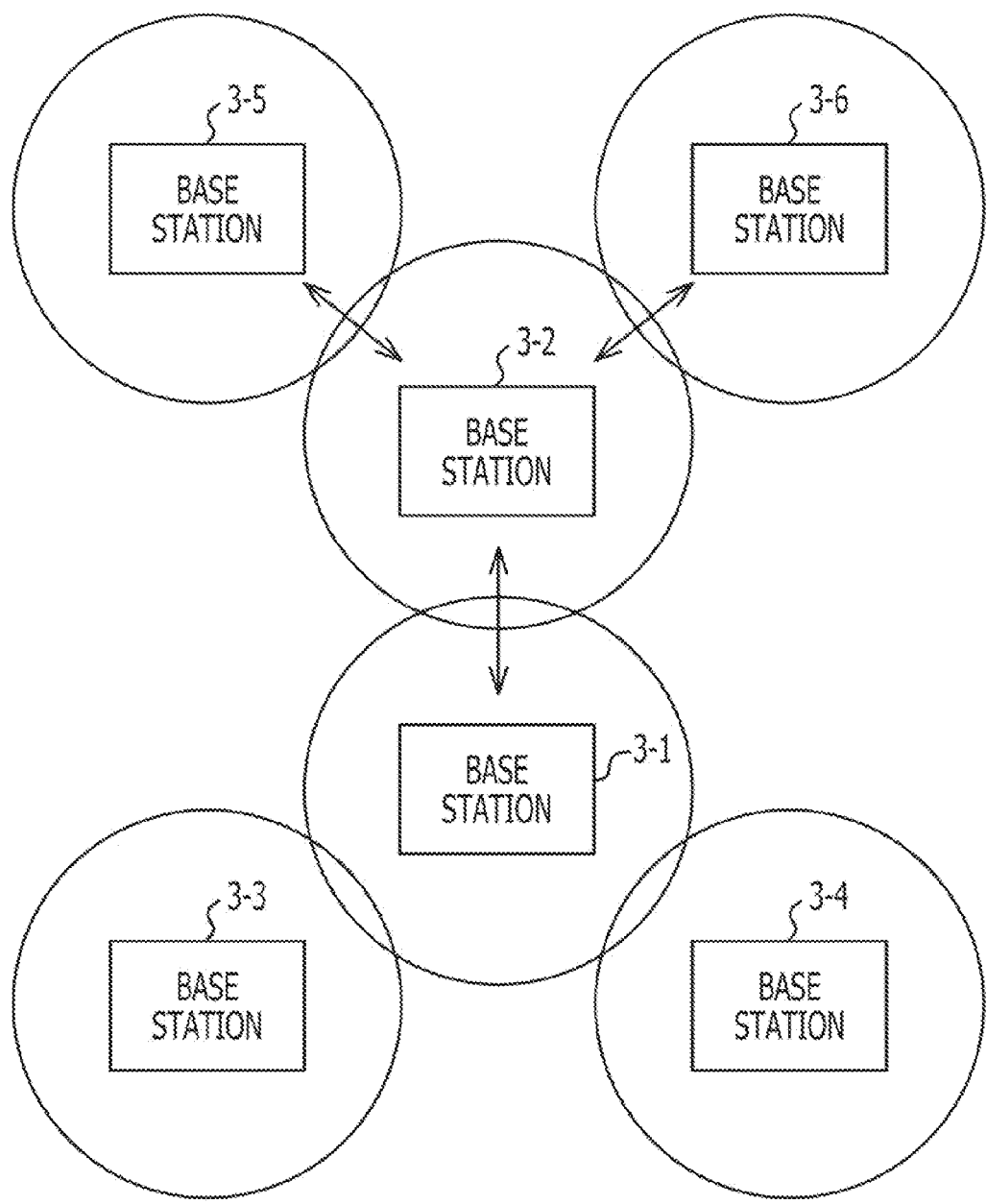
FIG. 20 illustrates a configuration of a communication system including multiple base stations.

An advantage of downloading the wireless quality measuring software and the communication software at different timings is explained in reference to the communication system illustrated in FIG. 20. Base station apparatuses 3-1 to 3-6 communicate with the mobile station 2 using the first to sixth communication protocols respectively. The wireless quality measuring software applications that are activated by the mobile station 2 to measure the wireless quality of signals received using the third to sixth communication protocols, are respectively indicated as "third communication protocol wireless quality measuring software" to "sixth communication protocol wireless quality measuring software".

The base station 3-1 is adjacent to the base stations 3-2, 3-3 and 3-4. Accordingly, the mobile station 2 connected to the base station 3-1 may be handed over to the mobile station 3-2, 3-3, or 3-4. Moreover, the base station 3-2 is adjacent to the base stations 3-1, 3-5, and 3-6, and thus the mobile station 2 to be connected to the mobile station 3-2 may be handed over to the mobile station 3-1, 3-5, or 3-6.

In this type of system, it is assumed that the mobile station 2 is to be handed over from the base station 3-1 to the base station 3-2. The second communication protocol communication software is downloaded to the mobile station 2 while the mobile station 2 is connected to the base station 3-1.

Furthermore, the base stations 3 obtain the wireless quality of the signals received by the mobile station 2 from adjacent base stations. As a result, when the mobile station 2 is connected to the base station 3-1, the mobile station 2 holds the wireless quality measuring software for the first communication protocol, the second communication protocol, the third communication protocol, and the fourth communication protocol. As a result, when the mobile station 2 is connected to the base station 3-2, the mobile station 2 holds the wireless quality measuring software for the second communication protocol, the first communication protocol, the fifth communication protocol, and the sixth communication protocol.

When the wireless quality measuring software and the communication software are downloaded at the same time, the base station 3-1 downloads, to the mobile station 2, the wireless quality measuring software corresponding to the communication protocols of the base stations 3-5 and 3-6 which are additionally adjacent to the adjacent base station 3-2.

Conversely in the present embodiment, it is sufficient that the base station 3-1 downloads the wireless quality measuring software corresponding to the communication protocol used by the base stations adjacent to the base station 3-1. It is simpler to evaluate the communication protocol used by the adjacent base station than to evaluate the communication protocols used by the base stations 3-5 and 3-6 that are additionally adjacent to the adjacent base station. For example, if the operators of the adjacent base station 3-2 and the base station 3-1 are different, identifying the base stations adjacent to the adjacent base station 3-2 is more difficult for the operator of the base station 3-1 than identifying the base stations adjacent to the base station 3-1.

As a result according to the present embodiment, it is possible to easily identify the wireless quality measuring software to be downloaded to the mobile station 2.

The downloading unit 22 of the mobile station 2 may set a limit to the amount of wireless quality measuring software stored in the memory 12. The downloading unit 22 may write downloaded wireless quality measuring programs over any wireless quality measuring program selected according to usage frequency when a limit of the amount of wireless quality measuring programs stored in the memory 12 is reached. Other embodiments may include the same feature.

Figure 21:
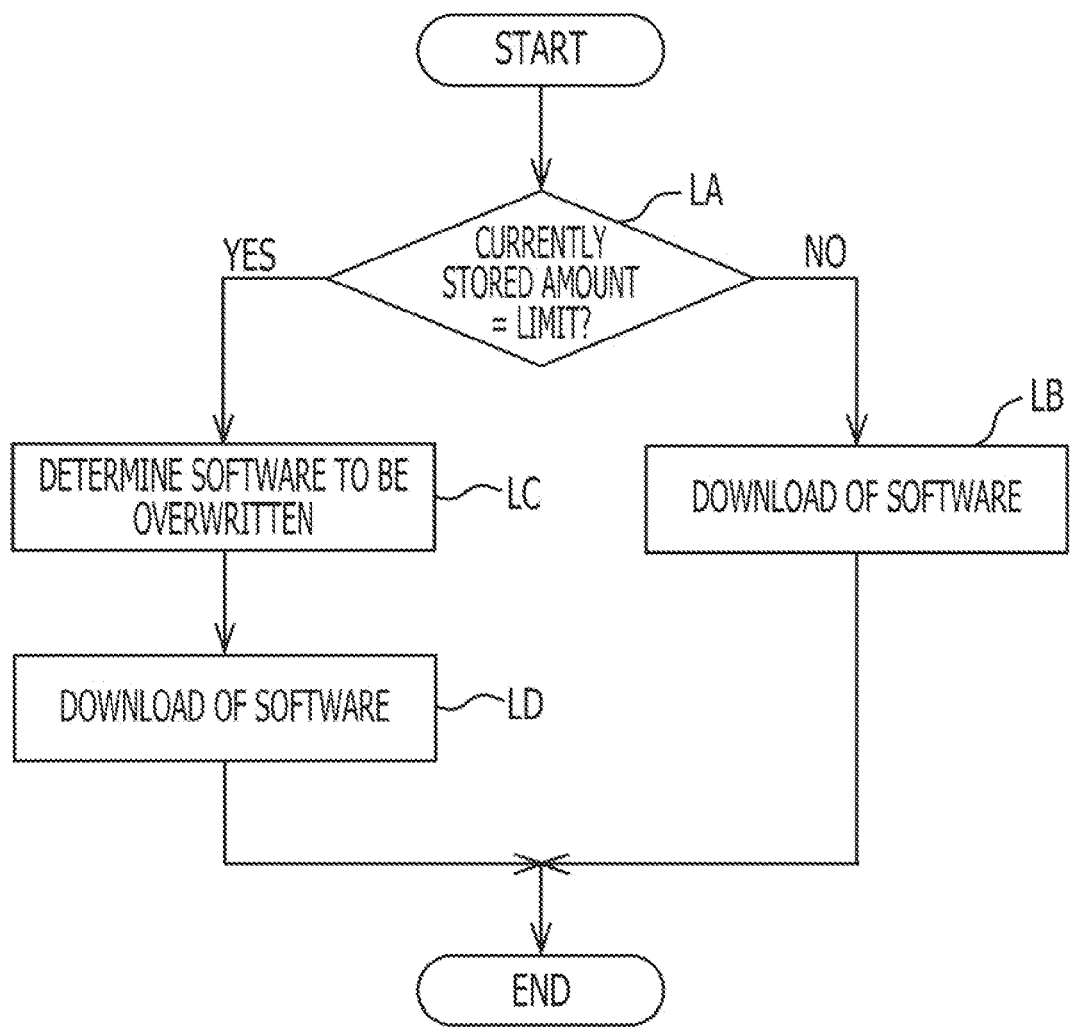
FIG. 21 illustrates wireless quality measurement software download processing.

FIG. 21 illustrates wireless quality measuring software download processing. The download processing may also be executed in operation JF illustrated in FIG. 18. The operations in operations LA to LD may be steps in other embodiments.

In operation LA, the downloading unit 22 determines whether or not the stored amount of wireless quality measuring software currently stored in the memory 12 using different communication protocols has reached the limit. If the stored amount has reached the limit (operation LA: Y), the processing advances to operation LB. If the stored amount has not reached the limit (operation LA: N), the processing advances to operation LC.

In operation LB, the downloading unit 22 downloads the wireless quality measuring software and stores the wireless quality measuring software in the memory 12.

In operation LC, the downloading unit 22 determines the software stored in the memory 12 to be overwritten by the wireless quality measuring software currently being downloaded. The downloading unit 22 selects the software to be overwritten according to the usage frequency of the wireless quality measuring software stored in the memory 12. "Usage frequency" herein refers to information indicating the degree in which the wireless quality measuring software is used for measuring and the concept may include past usage frequency, the number of times used per unit time, and the like. For example, the downloading unit 22 may select wireless quality measuring software with low frequency usage values as high priority for overwriting.

For example, the downloading unit 22 may create a usage frequency table that records the usage frequency of each wireless quality measuring software and store the table in the memory 12.

Figure 22:
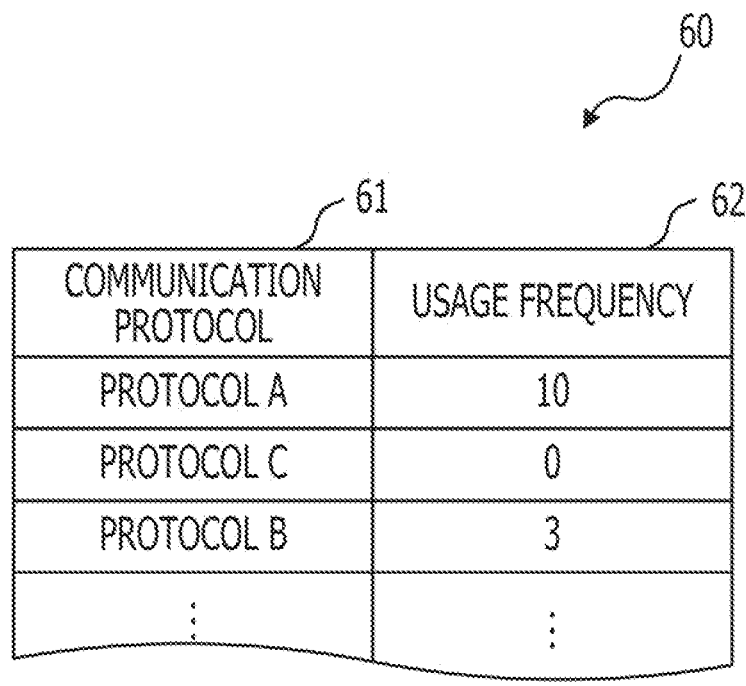
FIG. 22 illustrates a usage frequency table.

FIG. 22 illustrates a usage frequency table. A usage frequency table 60 may have a field 61 for storing communication protocols measured by the wireless quality measuring software stored in the memory 12, and a field 62 that stores the usage frequency of each software application.

Referring to FIG. 21, in operation LD, the downloading unit 22 downloads the wireless quality measuring software. The downloading unit 22 writes the currently downloaded wireless quality measuring software over the software selected in operation LC.

According to the present embodiment, the memory of the mobile station 2 may be further economized by not holding wireless quality measuring software that is not frequently used.

According to the devices and methods disclosed in the present embodiments, failures in downloading communication protocol communication software after a handover may be reduced when handovers between communication areas with different communication protocols are executed.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:

1. A first base station comprising:
a first receiver that receives a signal from a mobile station, the signal indicating a first wireless quality that is a wireless quality of signals received by the mobile station which uses software-defined radio and communicates with the first base station using a first communication protocol; and
a processor that
executes processing to download, from the first base station to the mobile station, communication software that causes the mobile station to execute communication processing according to a second communication protocol which is used by the mobile terminal to communicate with a second base station, based on a first condition of the first wireless quality, and
executes processing to transmit, to the mobile station, a handover instruction signal to cause a handover of the mobile station to the second base station that communicates with the mobile station using the second communication protocol based on a second condition of the first wireless quality, wherein
the first condition is a condition set to be satisfied before the second condition when the first wireless quality decreases.

2. The first base station according to claim 1, wherein
the processor executes processing to estimate a downloadable amount of data up to the handover of the mobile station based on a variation in the first wireless quality, and executes processing to determine that the first wireless quality satisfies the first condition when the estimated downloadable amount of data is equal to or less than a remaining amount of download data of the communication software.

3. The first base station according to claim 1, wherein
the processor interrupts downloading when the first wireless quality received after the downloading has started does not satisfy the first condition.

4. The first base station according to claim 1, further comprising:
a second receiver that receives, from the mobile station, a signal indicating a second wireless quality that is measured by activating a wireless quality measuring program that is downloaded when the mobile station connects to the first base station and causes the mobile station to execute processing to measure wireless quality of signals received using the second communication protocol, wherein
the processor executes, based on the second wireless quality, processing to download the communication software to the mobile station when a communication protocol of a target base station to which the mobile station is handed over from the first base station is the second communication protocol.

5. A handover method comprising:
receiving, at a first base station that executes communication using a first communication protocol with a mobile station which uses software-defined radio, a signal indicating a first wireless quality that is a wireless quality of signals received by the mobile station from the first base station;
downloading, from the first base station to the mobile station, communication software that causes the mobile station to execute communication processing using a second communication protocol which is used by the mobile terminal to communicate with a second base station, based on a first condition of the first wireless quality; and
transmitting, from the first base station to the mobile station, a handover instruction signal to cause a handover of the mobile station to the second base station communicating with the mobile station using the second communication protocol, based on a second condition of the first wireless quality, wherein
the first condition is a condition set to be satisfied before the second condition when the first wireless quality decreases.

6. The handover method according to claim 5, further comprising:
estimating a downloadable amount of data up to the handover of the mobile station based on a variation in the first wireless quality; and determining that the first wireless quality satisfies the first condition when the estimated downloadable amount of data is equal to or less than a remaining amount of download data of the communication software.

7. The handover method according to claim 5, further comprising:
interrupting the downloading when the first wireless quality received after the downloading has started does not satisfy the first condition.

8. The handover method according to claim 5, further comprising:
receiving, from the mobile station, a signal indicating a second wireless quality that is measured by activating a wireless quality measuring program that is downloaded when the mobile station connects to the first base station and causes the mobile station to execute processing to measure wireless quality of signals received using the second communication protocol, wherein
the downloading includes downloading, based on the second wireless quality, the communication software to the mobile station when a communication protocol of a target base station to which the mobile station is handed over from the first base station is the second communication protocol.

9. The first base station according to claim 1, wherein the first communication protocol is a first RAT (Radio Access Technology) and the second communication protocol is a second RAT.

* * * * *